(12) United States Patent
Oosawa

(10) Patent No.: US 6,636,627 B1
(45) Date of Patent: Oct. 21, 2003

(54) LIGHT SOURCE DIRECTION ESTIMATING METHOD AND APPARATUS

(75) Inventor: Akira Oosawa, Kaisei-machi (JP)

(73) Assignee: Fuji Photo Film Co.,, Kanagawa-ken (JP)

( * ) Notice: Subject to any disclaimer, the term of this patent is extended or adjusted under 35 U.S.C. 154(b) by 474 days.

(21) Appl. No.: 09/614,611

(22) Filed: Jul. 12, 2000

(30) Foreign Application Priority Data

| Jul. 12, 1999 | (JP) | ............................................ 11/196862 |
| Jul. 12, 1999 | (JP) | ............................................ 11/196863 |
| May 26, 2000 | (JP) | ........................................ 2000/157229 |
| May 26, 2000 | (JP) | ........................................ 2000/157230 |

(51) Int. Cl.$^7$ ................................................. G06K 9/00
(52) U.S. Cl. ...................................... 382/154; 345/426
(58) Field of Search ................................. 382/154, 100, 382/106; 356/2, 4.01, 4.07; 345/419, 426; 348/42

(56) References Cited

U.S. PATENT DOCUMENTS

| 6,097,394 A | * | 8/2000 | Levoy et al. ................. 345/419 |
| 6,233,004 B1 | * | 5/2001 | Tanaka et al. ................. 348/48 |
| 6,396,495 B1 | * | 5/2002 | Parghi et al. ................. 345/426 |
| 6,441,888 B1 | * | 8/2002 | Azuma et al. ............. 356/4.01 |

OTHER PUBLICATIONS

Sato et al., Institute of Industrial Science, pp. 17–25 (1998).

* cited by examiner

*Primary Examiner*—Yon J. Couso
(74) *Attorney, Agent, or Firm*—Birch, Stewart, Kolasch & Birch, LLP

(57) ABSTRACT

An image is obtained, which image has been formed by performing an image recording operation on an object under a substantially single light source, the object containing an area, which has approximately uniform surface reflectivity and which exhibits diffuse reflection. The direction of the light source, under which the image recording operation was performed, is estimated in accordance with signal values of an object image signal, which represents an object image embedded in the image having been obtained from the image recording operation, and relationship between a position of a three-dimensional body image, which is represented by a position-matched three-dimensional shape signal that has been obtained from position matching performed on the object image signal and a three-dimensional shape signal representing a three-dimensional shape of the object, and positions of virtual light sources having been set in a plurality of arbitrary directions.

36 Claims, 18 Drawing Sheets

FIG.2A
FIG.2B
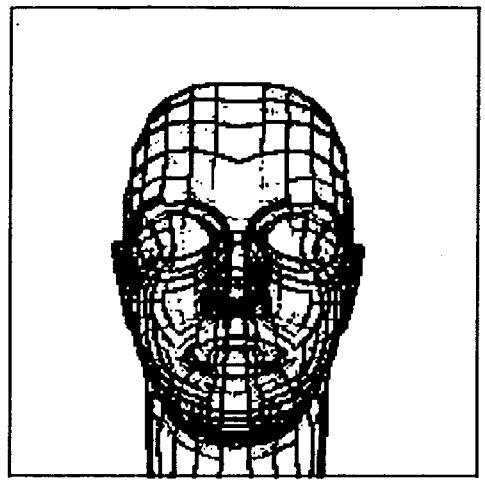
FIG.2C
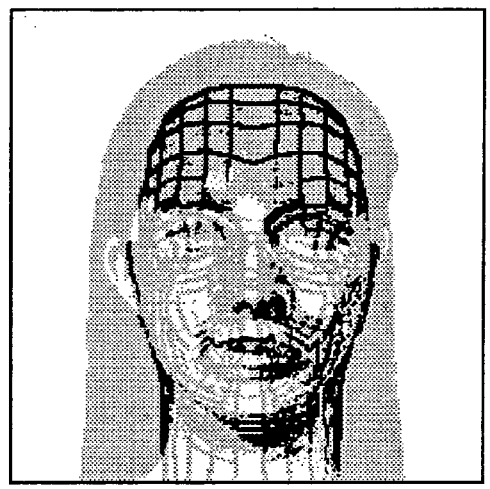
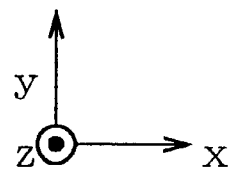

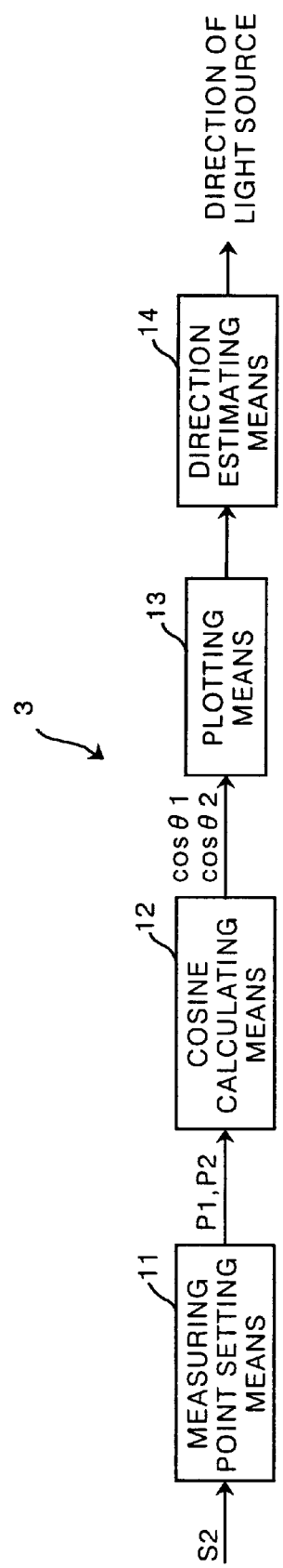

LIGHT SOURCE DIRECTION ESTIMATING METHOD AND APPARATUS

BACKGROUND OF THE INVENTION

1. Field of the Invention

This invention relates to a light source direction estimating method and apparatus, wherein a direction of a light source is estimated from an image having been obtained by performing an image recording operation by use of a single light source or a plurality of light sources. This invention also relates to a recording medium, on which a program for causing a computer to execute the light source direction estimating method has been recorded and from which the computer is capable of reading the program.

2. Description of the Related Art

Techniques for combining a real image and a virtual image, such as a computer graphics (CG) image, to obtain a composed image giving no unnatural feeling are referred to as mixed reality techniques and are expected to play an important role in various fields, such as communication, traffic, and amusements. In order for a real image and a virtual image to be combined such that a composed image giving no unnatural feeling can be obtained, it is necessary for the real image and the virtual image to be combined with geometrical, optical, and temporal consistency. In particular, as for the optical consistency, if the direction of a light source and the intensity of light radiated out from the light source with respect to the real image and the direction of a light source and the intensity of light radiated out from the light source with respect to the virtual image do not coincide with each other, a composed image giving an unnatural feeling is obtained. Therefore, the optical consistency is important markedly. Accordingly, a technique for estimating a distribution of intensity of light radiated out from a light source in accordance with an image has been proposed in, for example, "Estimation of illumination distribution by using soft shadows" by I. Sato, et al., Computer Vision And Image Media, 110-3, Mar. 19, 1998, pp. 17–24.

With the technique proposed by Sato, et al., an intensity distribution of environmental illumination is estimated on the basis of a soft shadow of a real object. Specifically, the intensity distribution of environmental illumination is estimated by utilizing a shadow of an object, whose three-dimensional shape is known, the shadow appearing in an image. More specifically, relationship between brightness of a virtual light source and a signal value at a certain measuring point on the object is expressed with a determinant, an inverse matrix of the matrix in the determinant is calculated, and the intensity distribution of light radiated out from the light source is thereby estimated. In cases where the intensity distribution of light radiated out from the light source is estimated from the image with the proposed technique, the intensity distribution of light radiated out from a light source with respect to a virtual image can be set to be identical with the intensity distribution of light radiated out from the light source with respect to the real image, and therefore the real image and the virtual image can be combined to form a composed image giving no unnatural feeling.

However, with the technique proposed by Sato, et al., it is necessary for the position of the measuring point to be set at a position which is mathematically linearly independent and which allows calculation of the inverse matrix. It is necessary for the position of the measuring point to be found with manual operations. Therefore, the operations cannot be kept simple.

SUMMARY OF THE INVENTION

The primary object of the present invention is to provide a light source direction estimating method, with which a direction of a single light source is capable of being estimated easily.

Another object of the present invention is to provide a light source direction estimating method, with which directions of a plurality of light sources are capable of being estimated easily.

A further object of the present invention is to provide an apparatus for carrying out the light source direction estimating method.

A still further object of the present invention is to provide a recording medium, on which a program for causing a computer to execute the light source direction estimating method has been recorded and from which the computer is capable of reading the program.

The present invention provides a first light source direction estimating method, wherein an image is obtained, which image has been formed by performing an image recording operation on an object under a substantially single light source, the object containing an area, which has approximately uniform surface reflectivity and which exhibits diffuse reflection, and wherein a direction of the light source, under which the image recording operation was performed, is estimated in accordance with the image, the method comprising the step of:

estimating the direction of the light source., under which the image recording operation was performed, in accordance with signal values of an object image signal, which represents an object image embedded in the image having been obtained from the image recording operation, and relationship between a position of a three-dimensional body image, which is represented by a position-matched three-dimensional shape signal that has been obtained from position matching performed on the object image signal and a three-dimensional shape signal representing a three-dimensional shape of the object, and positions of virtual light sources having been set in a plurality of arbitrary directions.

The term "performing an image recording operation under a substantially single light source" as used herein means that the image recording operation is performed in a state approximately identical to the state in which it can be regarded that a single light source alone is utilized and the presence of other light sources can be ignored as in the cases where the image recording operation is performed under the sunlight in fine weather.

The term "three-dimensional shape signal representing a three-dimensional shape of an object" as used herein means the signal representing the shape of the object itself.

The term "position matching performed on an object image signal and a three-dimensional shape signal" as used herein means the operation for matching the object image signal and the three-dimensional shape signal such that the orientation, the center position, the size, and the like, of the object in the image, which has been obtained from the image recording operation, and the orientation, the center position, the size, and the like, of the three-dimensional shape of the object may coincide with each other.

The first light source direction estimating method in accordance with the present invention should preferably be modified such that a plurality of measuring points are set at an area of the three-dimensional body image, which is represented by the position-matched three-dimensional shape signal that has been obtained from the position matching, the area of the three-dimensional body image corresponding to the area of the object, which area has approximately uniform surface reflectivity and which exhibits diffuse reflection, a calculation is made to find a cosine between a direction vector directed from each of virtual light sources, which have been set in a plurality of arbitrary directions, to each of the measuring points and a normal vector at each of the measuring points, a relationship between the calculated cosines and signal values of the object image signal, which signal values correspond to the plurality of the measuring points, is plotted with respect to each of the directions of the virtual light sources, and a direction of a virtual light source, which direction is associated with a plotted relationship that forms an approximately straight line, is estimated as the direction of the light source, under which the image recording operation was performed.

The direction vector can be calculated from the spatial coordinates of the virtual light source and the spatial coordinates of the measuring point. The normal vector can be calculated from the signal value of the position-matched three-dimensional shape signal, which signal value corresponds to the spatial coordinates of the measuring point. Also, the cosine can be calculated from the inner product of the direction vector and the normal vector.

Also, the first light source direction estimating method in accordance with the present invention should preferably be modified such that a judgment as to whether the plotted relationship forms or does not form an approximately straight line is made in accordance with an evaluating function utilizing a method of least squares, and the estimation of the direction of the light source, under which the image recording operation was performed, is performed in accordance with the results of the judgment.

Further, the first light source direction estimating method in accordance with the present invention should preferably be modified such that intensity of light radiated out from the light source, under which the image recording operation was performed, is estimated in accordance with an inclination of a straight line that is set by the plotted relationship utilized for the estimation of the direction of the light source, under which the image recording operation was performed.

Furthermore, in the first light source direction estimating method in accordance with the present invention, the object should preferably be a face of a person.

A flesh color area of a face of a person can be regarded as having approximately uniform surface reflectivity.

Also, in the first light source direction estimating method in accordance with the present invention, the three-dimensional shape signal should preferably be a polygon signal representing the three-dimensional shape of the object.

The present invention also provides a first light source direction estimating apparatus, wherein an image is obtained, which image has been formed by performing an image recording operation on an object under a substantially single light source, the object containing an area, which has approximately uniform surface reflectivity and which exhibits diffuse reflection, and wherein a direction of the light source, under which the image recording operation was performed, is estimated in accordance with the image, the apparatus comprising:

means for estimating the direction of the light source, under which the image recording operation was performed, in accordance with signal values of an object image signal, which represents an object image embedded in the image having been obtained from the image recording operation, and relationship between a position of a three-dimensional body image, which is represented by a position-matched three-dimensional shape signal that has been obtained from position matching performed on the object image signal and a three-dimensional shape signal representing a three-dimensional shape of the object, and positions of virtual light sources having been set in a plurality of arbitrary directions.

The first light source direction estimating apparatus in accordance with the present invention should preferably be modified such that the means for estimating the direction of the light source, under which the image recording operation was performed, comprises:

position matching means for performing position matching on the object image signal, which represents the object image embedded in the image having been obtained from the image recording operation, and the three-dimensional shape signal representing the three-dimensional shape of the object, measuring point setting means for setting a plurality of measuring points at an area of the three-dimensional body image, which is represented by the position-matched three-dimensional shape signal that has been obtained from the position matching, the area of the three-dimensional body image corresponding to the area of the object, which area has approximately uniform surface reflectivity and which exhibits diffuse reflection, cosine calculating means for calculating a cosine between a direction vector directed from each of virtual light sources, which have been set in a plurality of arbitrary directions, to each of the measuring points and a normal vector at each of the measuring points, plotting means for plotting a relationship between the calculated cosines and signal values of the object image signal, which signal values correspond to the plurality of the measuring points, with respect to each of the directions of the virtual light sources, and direction estimating means for estimating a direction of a virtual light source, which direction is associated with a plotted relationship that forms an approximately straight line, as the direction of the light source, under which the image recording operation was performed.

Also, the first light source direction estimating apparatus in accordance with the present invention should preferably be modified such that the direction estimating means comprises judgment means for making a judgment as to whether the plotted relationship forms or does not form an approximately straight line, the judgment being made in accordance with an evaluating function utilizing a method of least squares, and performing the estimation of the direction of the light source, under which the image recording operation was performed, in accordance with the results of the judgment.

Further, the first light source direction estimating apparatus in accordance with the present invention should preferably be modified such that the apparatus further comprises intensity estimating means for estimating intensity of light radiated out from the light source, under which the image recording operation was performed, in accordance with an inclination of a straight line that is set by the plotted relationship utilized for the estimation of the direction of the light source, under which the image recording operation was performed.

Furthermore, in the first light source direction estimating apparatus in accordance with the present invention, the object should preferably be a face of a person.

Also, in the first light source direction estimating apparatus in accordance with the present invention, the three-dimensional shape signal should preferably be a polygon signal representing the three-dimensional shape of the object.

The present invention further provides a recording medium, on which a program for causing a computer to execute the first light source direction estimating method in accordance with the present invention has been recorded and from which the computer is capable of reading the program.

The present invention still further provides a second light source direction estimating method, wherein an image is obtained, which image has been formed by performing an image recording operation on an object under a plurality of light sources such that light interception occurs, the object containing an area, which has approximately uniform surface reflectivity and which exhibits diffuse reflection, and wherein a direction of each of the light sources, under which the image recording operation was performed, is estimated in accordance with the image, the method comprising the step of:

estimating the direction of each of the light sources, under which the image recording operation was performed, in accordance with signal values of an object image signal, which represents an object image embedded in the image having been obtained from the image recording operation, and relationship between a position of a three-dimensional body image, which is represented by a position-matched three-dimensional shape signal that has been obtained from position matching performed on the object image signal and a three-dimensional shape signal representing a three-dimensional shape of the object, and positions of virtual light sources having been set in a plurality of arbitrary directions.

The object employed in the second light source direction estimating method in accordance with the present invention is an object which has unevenness on its surface and whose three-dimensional shape is known.

In the second light source direction estimating method in accordance with the present invention, with the position matching performed on the object image signal and the three-dimensional shape signal, the object image signal and the three-dimensional shape signal are matched with each other such that the orientation, the center position, the size, and the like, of the object in the image, which has been obtained from the image recording operation, and the orientation, the center position, the size, and the like, of the three-dimensional shape of the object may coincide with each other.

The second light source direction estimating method in accordance with the present invention should preferably be modified such that the direction of each of the light sources, under which the image recording operation was performed, is estimated by:

selecting combinations of virtual light sources from the virtual light sources having been set in the plurality of the arbitrary directions, setting a plurality of measuring points at an area of the three-dimensional body image, which is represented by the position-matched three-dimensional shape signal that has been obtained from the position matching, the area of the three-dimensional body image corresponding to the area of the object, which area has approximately uniform surface reflectivity and which exhibits diffuse reflection, selecting single-irradiation measuring points, which are exposed to only light radiated out from a single virtual light source when light is irradiated from each of the combinations of the virtual light sources to the three-dimensional body image, from the plurality of the measuring points and in accordance with the object image signal, calculating a cosine between a direction vector, which is directed from the single virtual light source to each of the single-irradiation measuring points, and a normal vector at each of the single-irradiation measuring point, plotting a relationship between the calculated cosines and signal values of the object image signal, which signal values correspond to the single-irradiation measuring points, with respect to each of the directions of the virtual light sources, estimating a direction of a virtual light source, which direction is associated with a plotted relationship that forms an approximately straight line, as a direction of one light source among the light sources, under which the image recording operation was performed, estimating a relative intensity value of light radiated out from the one light source in accordance with an inclination of a straight line, which is set by the plotted relationship utilized for the estimation of the direction of the one light source, removing effects of light, which is radiated out from the one light source, from the object image signal, which has been subjected to the position matching, in accordance with the relative intensity value of light radiated out from the one light source, to acquire a corrected object image signal, and iterating the selection of combinations of virtual light sources from the virtual light sources other than the virtual light source located in the direction of the one light source, the selection of single-irradiation measuring points in accordance with the corrected object image signal being employed as a new object image signal, the calculation of cosines, the plotting, the estimation of a direction of one light source, the estimation of a relative intensity value of light radiated out from the one light source, and the acquisition of a corrected object image signal, till directions of all of the light sources, under which the image recording operation was performed, are estimated.

In cases where, for example, the object has a convex part, an area which is hidden behind the convex part and upon which light does not impinge occurs, depending upon the direction of a light source. In this specification, the state in which light does not impinge upon an area is referred to as the light interception.

The term "selecting a combination of virtual light sources from virtual light sources having been set in a plurality of arbitrary directions" as used herein means that a combination of a certain number of virtual light source is selected from the virtual light sources having been set in the plurality of the arbitrary directions. Specifically, in cases where the number of the virtual light sources having been set is represented by n, and the number of the virtual light sources constituting each combination is represented by m, where m=1 to n, the total number of the combinations is equal to the sum of combinations nCm for m=1 to n.

The term "single-irradiation measuring point" as used herein means the point such that, when calculations are made to find vectors, each of which is directed from each of the virtual light sources constituting a combination to each of the measuring points having been set at an area of the three-dimensional body image represented by the position-matched three-dimensional shape signal that has been obtained from the position matching, only a single vector among the thus calculated vectors can reach the point without being intercepted by the three-dimensional body image due to the light interception or the cosine taking a negative value.

The direction vector can be calculated from the spatial coordinates of the virtual light source and the spatial coordinates of the single-irradiation measuring point. The normal vector can be calculated from the signal value of the position-matched three-dimensional shape signal, which signal value corresponds to the spatial coordinates of the measuring point. Also, the cosine can be calculated from the inner product of the direction vector and the normal vector.

The object image signal is obtained as intensity values of light reflected by the object when the light radiated out from the plurality of the light sources impinges upon the object. The intensity values obtained with the light, which is radiated out from the one light source having been estimated, represent the image of the object obtained when only the light radiated out from the light source located in the estimated direction impinges upon the object. Therefore, in cases where the intensity values obtained with the light, which is radiated out from the one light source having been estimated, are removed from the object image signal, the intensity values, which occur when the light having been radiated out from the light sources other than the one light source having been estimated is reflected from the object, can be obtained. The thus obtained intensity values are taken as the corrected object image signal.

Also, the second light source direction estimating method in accordance with the present invention should preferably be modified such that, in cases where the number of the light sources, under which the image recording operation was performed, is known, combinations of the virtual light sources in accordance with the number of the light sources, under which the image recording operation was performed, are selected from the virtual light sources having been set in the plurality of the arbitrary directions.

In cases where the number of the virtual light sources having been set in the plurality of the arbitrary directions is represented by n, and the number of the light sources, under which the image recording operation was performed, is represented by k, the number of the combinations of the virtual light sources becomes equal to nCk.

Further, the second light source direction estimating method in accordance with the present invention should preferably be modified such that a judgment as to whether the plotted relationship forms or does not form an approximately straight line is made in accordance with an evaluating function utilizing a method of least squares, and the estimation of the direction of the light source is performed in accordance with the results of the judgment.

Furthermore, in the second light source direction estimating method in accordance with the present invention, the object should preferably be a face of a person.

A flesh color area of a face of a person can be regarded as having approximately uniform surface reflectivity.

Also, in the second light source direction estimating method in accordance with the present invention, the three-dimensional shape signal should preferably be a polygon signal representing the three-dimensional shape of the object.

The present invention also provides a second light source direction estimating apparatus, wherein an image is obtained, which image has been formed by performing an image recording operation on an object under a plurality of light sources such that light interception occurs, the object containing an area, which has approximately uniform surface reflectivity and which exhibits diffuse reflection, and wherein a direction of each of the light sources, under which the image recording operation was performed, is estimated in accordance with the image, the apparatus comprising:

means for estimating the direction of each of the light sources, under which the image recording operation was performed, in accordance with signal values of an object image signal, which represents an object image embedded in the image having been obtained from the image recording operation, and relationship between a position of a three-dimensional body image, which is represented by a position-matched three-dimensional shape signal that has been obtained from position matching performed on the object image signal and a three-dimensional shape signal representing a three-dimensional shape of the object, and positions of virtual light sources having been set in a plurality of arbitrary directions.

The second light source direction estimating apparatus in accordance with the present invention should preferably be modified such that the means for estimating the direction of each of the light sources, under which the image recording operation was performed, comprises:

combination selecting means for selecting combinations of virtual light sources from the virtual light sources having been set in the plurality of the arbitrary directions, measuring point setting means for setting a plurality of measuring points at an area of the three-dimensional body image, which is represented by the position-matched three-dimensional shape signal that has been obtained from the position matching, the area of the three-dimensional body image corresponding to the area of the object, which area has approximately uniform surface reflectivity and which exhibits diffuse reflection, single-irradiation measuring point selecting means for selecting single-irradiation measuring points, which are exposed to only light radiated out from a single virtual light source when light is irradiated from each of the combinations of the virtual light sources to the three-dimensional body image, from the plurality of the measuring points and in accordance with the object image signal, cosine calculating means for calculating a cosine between a direction vector, which is directed from the single virtual light source to each of the single-irradiation measuring points, and a normal vector at each of the single-irradiation measuring point, plotting means for plotting a relationship between the calculated cosines and signal values of the object image signal, which signal values correspond to the single-irradiation measuring points, with respect to each of the directions of the virtual light sources, direction estimating means for estimating a direction of a virtual light source, which direction is associated with a plotted relationship that forms an approximately straight line, as a direction of one light source among the light sources, under which the image recording operation was performed, intensity value estimating means for estimating a relative intensity value of light radiated out from the one light source in accordance with an inclination of a straight line, which is set by the plotted relationship utilized for the estimation of the direction of the one light source, correction means for removing effects of light, which is radiated out from the one light source, from the object image signal, which has been subjected to the position matching, in accordance with the relative intensity value of light radiated out from the one light source, to acquire a corrected object image signal, and control means for controlling the combination selecting means, the measuring point setting means, the single-irradiation measuring point selecting means, the cosine calculating means, the plotting means, the direction estimating means, the intensity value estimating means, and the correction means, such that the selection of combinations of virtual light sources from the virtual light sources other than the virtual light source located in the direction of the one light source, the selection of single-irradiation measuring points in accordance with the corrected object image signal being employed as a new object image signal, the calculation of cosines, the plotting, the estimation of a direction of one light source, the estimation of a relative intensity value of light radiated out from the one light source, and the acquisition of a corrected object image signal, are iterated till directions of all of the light sources, under which the image recording operation was performed, are estimated.

Also, the second light source direction estimating apparatus in accordance with the present invention should preferably be modified such that, in cases where the number of the light sources, under which the image recording operation was performed, is known, the combination selecting means selects combinations of the virtual light sources in accordance with the number of the light sources, under which the image recording operation was performed, from the virtual light sources having been set in the plurality of the arbitrary directions.

Further, the second light source direction estimating apparatus in accordance with the present invention should preferably be modified such that the direction estimating means comprises judgment means for making a judgment as to whether the plotted relationship forms or does not form an approximately straight line, the judgment being made in accordance with an evaluating function utilizing a method of least squares, and performing the estimation of the direction of the light source in accordance with the results of the judgment.

Furthermore, in the second light source direction estimating apparatus in accordance with the present invention, the object should preferably be a face of a person.

Also, in the second light source direction estimating apparatus in accordance with the present invention, the three-dimensional shape signal should preferably be a polygon signal representing the three-dimensional shape of the object.

The present invention further provides a recording medium, on which a program for causing a computer to execute the second light source direction estimating method in accordance with the present invention has been recorded and from which the computer is capable of reading the program.

With the first light source direction estimating method and apparatus in accordance with the present invention, in cases where only the signal values of the object image signal and the relationship between the position of the three-dimensional body image, which is represented by the position-matched three-dimensional shape signal that has been obtained from the position matching with the object image signal, and the positions of virtual light sources having been set in the plurality of the arbitrary directions are found, the direction of the light source, under which the image recording operation was performed, can be estimated. Therefore, it is not necessary for a measuring point, which allows calculation of an inverse matrix, to be found as in the technique proposed by Sato, et al. Also, it is not necessary for matrix operations to be performed. Accordingly, the direction of the light source, under which the image recording operation was performed, can be estimated with comparatively simple operations. Further, in cases where a real image and a virtual image, such as a CG image, are to be combined with each other, the virtual image can be corrected in accordance with the direction of the light source having been estimated from the real image, such that the virtual image is illuminated by an appropriate light source, and the real image and the virtual image can then be combined with each other. Therefore, a composed image giving no unnatural feeling can be obtained. Furthermore, in an encoding system, such as MPEG-4, wherein an image is transferred with respect to each of objects and image composition is performed at the stage of seeing an animation, in cases where a real image and a virtual image are contained in the objects, the illuminating direction for the virtual image can be corrected in accordance with the illuminating direction for the real image, and the image composition can then be performed. In this manner, a composed animation giving no unnatural feeling can be obtained. Also, in the cases of an image obtained by performing the image recording operation under the sunlight, by the estimation of the direction of the sunlight from the image, rear light compensation and image density compensation with respect to the image can be performed easily.

Particularly, the estimation of the direction of the light source, under which the image recording operation was performed on the object, should preferably be performed in accordance with the characteristics described below. Specifically, a calculation may be made to find a cosine between a direction vector directed from a virtual light source to a certain measuring point, which has been set at an area on the object image corresponding to the object area having uniform surface reflectivity, and a normal vector at the measuring point. In cases where the position of the virtual light source coincides with the position of the light source, under which the image recording operation was performed on the object, the relationship between the cosines, which have thus been calculated for a plurality of measuring points, and the intensity values of reflected light corresponding to the measuring points, i.e. the signal values of the object image signal, which signal values correspond to the measuring points, forms a straight line relationship. In accordance with such characteristics, the estimation of the direction of the light source, under which the image recording operation was performed, should preferably be performed in the manner described below. Specifically, after the position matching is performed on the object image signal and the three-dimensional shape signal, a plurality of measuring points are set at the area of the three-dimensional body image, which is represented by the position-matched three-dimensional shape signal that has been obtained from the position matching, the area of the three-dimensional body image corresponding to the area of the object, which area has approximately uniform surface reflectivity and which exhibits diffuse reflection. A calculation is made to find the cosine between the direction vector directed from each of the virtual light sources, which have been set in a plurality of arbitrary directions, to each of the measuring points. Also, a calculation is made to find the normal vector at each of the measuring points. The relationship between the calculated cosines and the signal values of the object image signal, which signal values correspond to the plurality of the measuring points, is then plotted with respect to each of the directions of the virtual light sources. Thereafter, the direction of a virtual light source, which direction is associated with a plotted relationship that forms an approximately straight line, is estimated as the direction of the light source, under which the image recording operation was performed.

Also, with the first light source direction estimating method and apparatus in accordance with the present invention, wherein the intensity of light radiated out from the light source, under which the image recording operation was performed, is also estimated, in cases where a real image and a virtual image are combined with each other in the manner described above, the virtual image can also be corrected in accordance with the intensity of light radiated out from light source, which intensity has been estimated from the real image, such that the virtual image is illuminated with light having an appropriate intensity, and the real image and the virtual image can then be combined with each other. Therefore, a composed image giving no unnatural feeling can be obtained.

Further, with the first light source direction estimating method and apparatus in accordance with the present invention, wherein the three-dimensional shape signal is the polygon signal, in cases where the plane, on which the measuring point is located, is found, the normal vector at the measuring point can be calculated immediately from the formula defining the plane. Therefore, the direction of the light source, under which the image recording operation was performed, can be estimated easily.

With the second light source direction estimating method and apparatus in accordance with the present invention, in cases where only the signal values of the object image signal and the relationship between the position of the three-dimensional body image, which is represented by the position-matched three-dimensional shape signal that has been obtained from the position matching with the object image signal, and the positions of virtual light sources having been set in the plurality of the arbitrary directions are found, the direction of each of the light sources, under which the image recording operation was performed, can be estimated. Therefore, it is not necessary for a measuring point, which allows calculation of an inverse matrix, to be found as in the technique proposed by Sato, et al. Also, it is not necessary for matrix operations to be performed. Accordingly, the directions of the plurality of the light sources, under which the image recording operation was performed, can be estimated with comparatively simple operations. Further, in cases where a real image and a virtual image, such as a CG image, are to be combined with each other, the virtual image can be corrected in accordance with the directions of the plurality of the light sources having been estimated from the real image, such that the virtual image is illuminated by appropriate light sources, and the real image and the virtual image can then be combined with each other. Therefore, a composed image giving no unnatural feeling can be obtained. Furthermore, in an encoding system, such as MPEG-4, wherein an image is transferred with respect to each of objects and image composition is performed at the stage of seeing an animation, in cases where a real image and a virtual image are contained in the objects, the illuminating direction for the virtual image can be corrected in accordance with the illuminating direction for the real image, and the image composition can then be performed. In this manner, a composed animation giving no unnatural feeling can be obtained.

Particularly, the estimation of the directions of the light sources, under which the image recording operation was performed on the object, should preferably be performed in accordance with the characteristics described below. Specifically, a calculation may be made to find a cosine between a direction vector directed from a virtual light source to a certain measuring point, which has been set at an area on the object image corresponding to the object area having uniform surface reflectivity, and a normal vector at the measuring point. In cases where the position of the virtual light source coincides with the position of one of the light sources, under which the image recording operation was performed on the object, the relationship between the cosines, which have thus been calculated for a plurality of measuring points, and the intensity values of reflected light corresponding to the measuring points, i.e. the signal values of the object image signal, which signal values correspond to the measuring points, forms a straight line relationship. In accordance with such characteristics, the estimation of the direction of each of the light sources, under which the image recording operation was performed, should preferably be performed in the manner described below.

Specifically, the position matching is performed on the object image signal and the three-dimensional shape signal, and combinations of virtual light sources are selected from the virtual light sources having been set in the plurality of the arbitrary directions. Also, the plurality of the measuring points are set at the area of the three-dimensional body image, which is represented by the position-matched three-dimensional shape signal that has been obtained from the position matching, the area of the three-dimensional body image corresponding to the area of the object, which area has approximately uniform surface reflectivity and which exhibits diffuse reflection. Further, the single-irradiation measuring points, which are exposed to only light radiated out from a single virtual light source when light is irradiated from each of the combinations of the virtual light sources to the three-dimensional body image, are selected from the plurality of the measuring points. Each of the single-irradiation measuring points is exposed to only the light radiated out from one virtual light source, which is among the virtual light sources constituting each combination, (in cases where a combination is constituted of only one virtual light source, the light radiated out from the one virtual light source). Furthermore, a calculation is made to find the cosine between the direction vector, which is directed from the single virtual light source to each of the single-irradiation measuring points, and a normal vector at each of the single-irradiation measuring point. Also, the relationship between the calculated cosines and signal values of the object image signal, which signal values correspond to the single-irradiation measuring points, is plotted with respect to the single virtual light source in each of the combinations of the virtual light sources. The direction of a single virtual light source, which direction is associated with a plotted relationship that forms an approximately straight line, is estimated as the direction of one light source among the light sources, under which the image recording operation was performed. Thereafter, the relative intensity value of light radiated out from the one light source is estimated in accordance with the inclination of the straight line, which is set by the plotted relationship utilized for the estimation of the direction of the one light source. In accordance with the relative intensity value of light radiated out from the one light source, the corrected object image signal is acquired, in which the effects of the light radiated out from the one light source have been removed. Also, with respect to the virtual light sources other than the virtual light source located in the direction of the one light source having been estimated, the selection of combinations of virtual light sources, the selection of single-irradiation measuring points in accordance with the corrected object image signal being employed as a new object image signal, the calculation of cosines, the plotting, the estimation of a direction of one light source, the estimation of a relative intensity value of light radiated out from the one light source, and the acquisition of a corrected object image signal, are iterated till directions of all of the light sources, under which the image recording operation was performed, are estimated.

Also, with the second light source direction estimating method and apparatus in accordance with the present invention, wherein the relative intensity values of light radiated out from the light sources, under which the image recording operation was performed, are also estimated, in cases where a real image and a virtual image are combined with each other in the manner described above, the virtual image can also be corrected in accordance with the relative intensity values of light radiated out from the light sources, which relative intensity values have been estimated from the real image, such that the virtual image is illuminated with light having an appropriate intensity, and the real image and the virtual image can then be combined with each other. Therefore, a composed image giving no unnatural feeling can be obtained. In cases where the surface reflectivity of the object is known, the absolute intensity of light radiated out from each of the light sources can also be estimated.

In such cases, with respect to an image having been obtained by performing the image recording operation under a plurality of different light sources, the effects of only a light source located in a specific direction can be compensated for. For example, in cases where the object image signal is composed of red (R), green (G), and blue (B) color signals, the intensity value of light radiated out from the light source may be estimated with respect to each of the color signals. In this manner, the ratio among the intensity values of the R, G, and B color components of the light radiated out from the light source can be calculated. Therefore, for example, it is possible to perform processing for compensating for the effects of only a light source radiating out light, in which the intensity of a specific color component (e.g., the R component) is higher than the intensities of the other color components.

In the second light source direction estimating method and apparatus in accordance with the present invention, in cases where the number of the light sources, under which the image recording operation was performed, is known, combinations of the virtual light sources in accordance with the number of the light sources, under which the image recording operation was performed, may be selected from the virtual light sources having been set in the plurality of the arbitrary directions. Therefore, in such cases, it is not necessary for the estimation of the directions of the light sources to be performed for the combinations with respect to the entire number of the light sources. Accordingly, the estimation of the directions of the light sources can be performed quickly.

Further, with the second light source direction estimating method and apparatus in accordance with the present invention, wherein the three-dimensional shape signal is the polygon signal, in cases where the plane, on which the measuring point is located, is found, the normal vector at the measuring point can be calculated immediately from the formula defining the plane. Therefore, the direction of the light source, under which the image recording operation was performed, can be estimated easily.

BRIEF DESCRIPTION OF THE DRAWINGS

FIGS. 2A, 2B, and 2C are explanatory views showing how position matching is performed on a two-dimensional image signal and a three-dimensional shape signal, FIG. 3 is a schematic block diagram showing estimation means employed in the first embodiment of the light source direction estimating apparatus in accordance with the present invention.

DESCRIPTION OF THE PREFERRED EMBODIMENTS

The present invention will hereinbelow be described in further detail with reference to the accompanying drawings.

Figure 1:
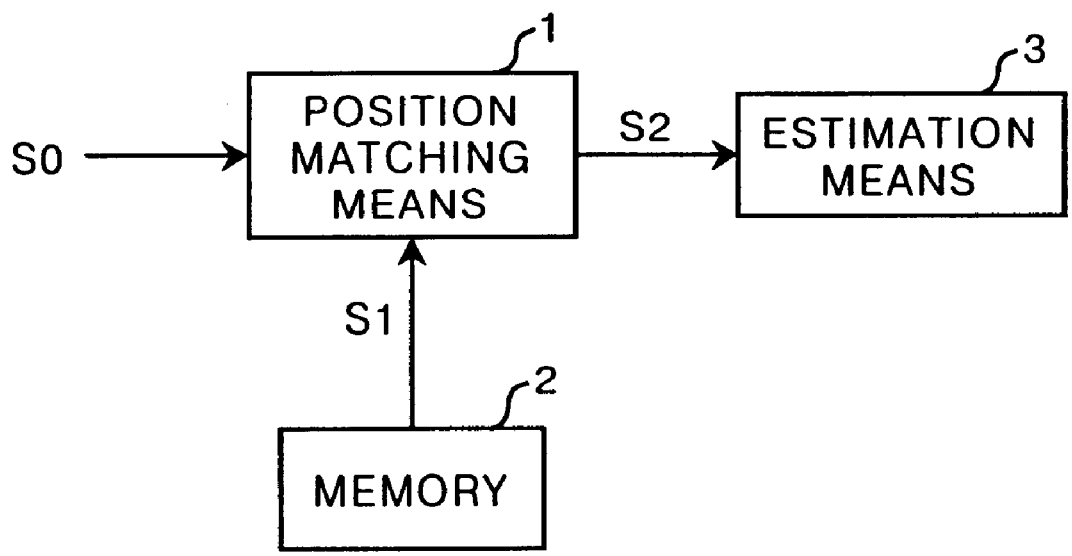
FIG. 1 is a schematic block diagram showing a first embodiment of the light source direction estimating apparatus in accordance with the present invention.

FIG. 1 is a schematic block diagram showing a first embodiment of the light source direction estimating apparatus in accordance with the present invention. As illustrated in FIG. 1, the first embodiment of the light source direction estimating apparatus in accordance with the present invention comprises position matching means 1 for performing position matching on a two-dimensional image signal S0 representing an image, in which an image of a face of a person is embedded, and a three-dimensional shape signal S1, which represents a three-dimensional shape of the face of the person. A composed signal S2 is obtained from the position matching. The first embodiment of the light source direction estimating apparatus in accordance with the present invention also comprises a memory 2 for storing the three-dimensional shape signal S1, and estimation means 3 for estimating a direction of a light source, under which an operation for recording the image represented by the two-dimensional image signal S0 was performed, from the image, in which the image of the face of the person is embedded, in accordance with the composed signal S2. In this embodiment, only a single light source is utilized for the image recording operation. Also, the flesh-color area of the face of the person has approximately uniform surface reflectivity and exhibits diffuse reflection.

The position matching means 1 performs the position matching on the two-dimensional image signal S0, which represents the image of the face of the person shown in FIG. 2A, and the three-dimensional shape signal S1, which represents the three-dimensional shape of the face of the person shown in FIG. 2B. Alteration of the orientation, the size, and the center position of the three-dimensional shape can be performed on the three-dimensional shape signal SI and in accordance with the face image represented by the two-dimensional image signal S0. The three-dimensional shape signal S1 is a polygon signal, which defines the three-dimensional shape with a plurality of planes. The position matching is performed by displaying the face image represented by the two-dimensional image signal S0 and the three-dimensional shape represented by the three-dimensional shape signal S1 on a monitor (not shown), matching the direction, the size, and the center position of the three-dimensional shape, which is represented by the three-dimensional shape signal S1, with the face image, which is represented by the two-dimensional image signal S0, with manual operations, while the displayed images are being seen. From the position matching, the composed signal S2, which represents a composed image shown in FIG. 2C, can be obtained. The composed signal S2 contains the two-dimensional image signal S0 and a position-matched three-dimensional shape signal S1', which has been obtained from the position matching. In FIGS. 2A, 2B, and 2C, the horizontal direction is taken as a x direction, the vertical direction is taken as a y direction, and the direction normal to the plane of the sheet of FIGS. 2A, 2B, and 2C is taken as a z direction.

In cases where a focusing point f of a camera, with which the person image was recorded, and a distance z0 between the camera and the face of the person are known, coordinates (xw, yw, zw) of a certain position on the three-dimensional shape, which is represented by the position-matched three-dimensional shape signal S1', and coordinates (xv, yv) of a position in the person image, which position corresponds to the certain position on the three-dimensional shape, can be expressed with Formulas (1) and (2) for perspective transform shown below.

$$xv = \alpha \cdot f \cdot xw/(f+zw+z0) \tag{1}$$

$$yv = \alpha \cdot f \cdot yw/(f+zw+z0) \tag{2}$$

in which a represents the scale, the x and y directions are the directions on the plane of the person image, and the z direction is the depth direction in the person image.

Since the three-dimensional shape signal S1 has values also in the depth direction (i.e., the z direction), in cases where the relationships of Formulas (1) and (2) are utilized, the correspondence relationship between the positions on the three-dimensional shape, which is represented by the position-matched three-dimensional shape signal S1', and the positions on the face image, which is represented by the two-dimensional image signal S0, can be set more accurately.

In cases where the focusing point f of the camera, or the like, is unknown, the correspondence relationship between the positions on the three-dimensional shape, which is represented by the position-matched three-dimensional shape signal S1', and the positions on the face image, which is represented by the two-dimensional image signal S0, cannot be set. However, the depth dimension of a person is markedly smaller than the distance between the camera and the person acting as the object. Therefore, in such cases, the z direction may be ignored. Accordingly, in such cases, if a certain position on the three-dimensional shape, which is represented by the position-matched three-dimensional shape signal S1', has coordinates (x1, y1, z1), the coordinates of the position in the person image, which position corresponds to the certain position on the three-dimensional shape, may be set as (x1, y1).

FIG. 3 is a schematic block diagram showing the estimation means 3 employed in the first embodiment of the light source direction estimating apparatus in accordance with the present invention. As illustrated in FIG. 3, the estimation means 3 comprises measuring point setting means 11 for setting a plurality of measuring points on the three-dimensional shape, which is represented by the position-matched three-dimensional shape signal S1'. The estimation means 3 also comprises cosine calculating means 12 for calculating a cosine between a direction vector directed from each of virtual light sources, which have been set in a plurality of arbitrary directions, to each of the measuring points and a normal vector at each of the measuring points. The estimation means 3 further comprises plotting means 13 for plotting a relationship between the calculated cosines and signal values of the two-dimensional image signal S0, which signal values correspond to the plurality of the measuring points, with respect to each of the directions of the virtual light sources. The estimation means 3 still further comprises direction estimating means 14 for estimating a direction of a virtual light source, which direction is associated with a plotted relationship that forms an approximately straight line, as the direction of the light source, under which the image recording operation was performed.

Figure 4:
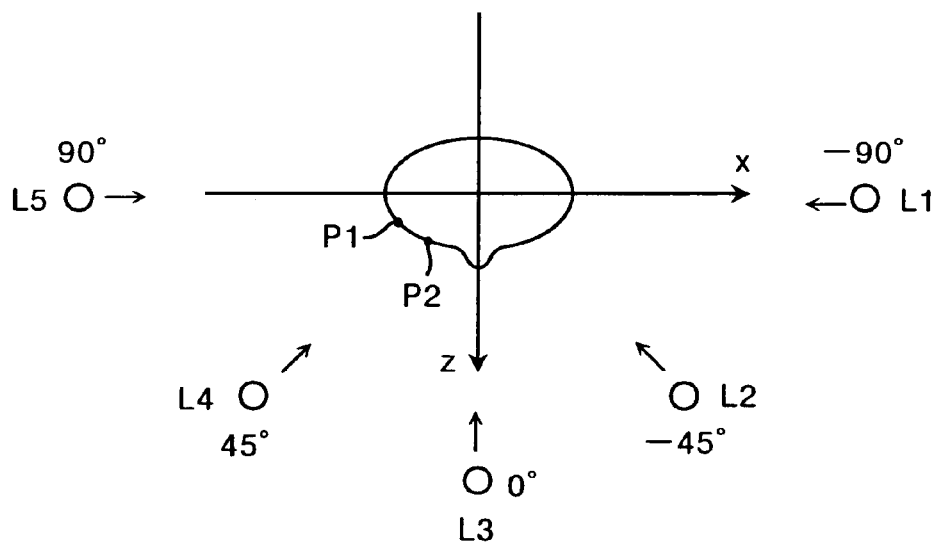
FIG. 4 is an explanatory view showing virtual light sources, which are set in a plurality of directions in the first embodiment of the light source direction estimating apparatus in accordance with the present invention.
Figure 5:
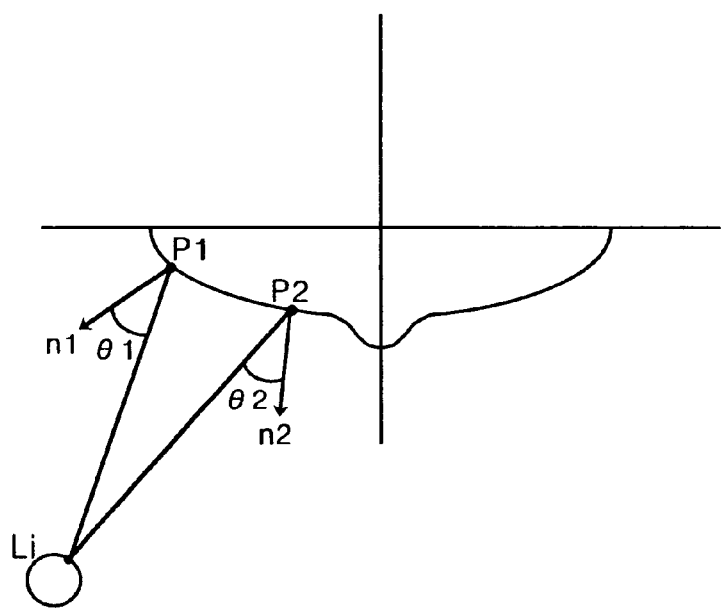
FIG. 5 is an explanatory view showing how cosines at measuring points are calculated.

In the estimation means 3, the direction of the light source is estimated in the manner described below. FIG. 4 is an explanatory view showing virtual light sources, which are set in a plurality of directions in the first embodiment of the light source direction estimating apparatus in accordance with the present invention. FIG. 5 is an explanatory view showing how cosines at measuring points are calculated. FIG. 4 is a cross-sectional view taken along a plane, which is normal to the y axis, in the three-dimensional shape represented by the position-matched three-dimensional shape signal S1'. As an aid in facilitating the explanation, the estimation of the direction of the light source is explained with the two-dimensional view shown in FIG. 4. Firstly, in the measuring point setting means 11, a plurality of measuring points are set on the three-dimensional shape, which is represented by the position-matched three-dimensional shape signal S1'. In FIGS. 4 and 5, as an aid in facilitating the explanation, only two measuring points P1 and P2 are shown. However, actually, a larger number of measuring points are set. The measuring points are set at an area on the three-dimensional shape represented by the position-matched three-dimensional shape signal S1', which area corresponds to the flesh-color area of the face of the person. Thereafter, as illustrated in FIG. 4, five virtual light sources L1, L2, L3, L4, and L5 are located at intervals of 45 degrees in the range of −90 degrees to +90 degrees around the y axis. As illustrated in FIG. 5, with respect to each of the virtual light sources L1, L2, L3, L4, and L5, the cosine calculating means 12 calculates a direction vector LiP1, wherein i=1 to 5, which is directed from each virtual light source to the measuring point P1, and a direction vector LiP2, wherein i=1 to 5, which is directed from each virtual light source to the measuring point P2. Also, the cosine calculating means 12 calculates a normal vector n1 at the measuring point P1 and a normal vector n2 at the measuring point P2. Further, the cosine calculating means 12 calculates a cosine cos θ1 between the direction vector LiP1 and the normal vector n1, and calculates a cosine cos θ2 between the direction vector LiP2 and the normal vector n2. Since the spatial coordinates of the virtual light sources L1, L2, L3, L4, and L5 and the spatial coordinates of the measuring points P1 and P2 can be found previously, the direction vector LiP1 can be calculated from the coordinates of each of the virtual light sources L1, L2, L3, L4, and L5 and the spatial coordinates of the measuring point P1. In the same manner, the direction vector LiP2 can be calculated from the coordinates of each of the virtual light sources L1, L2, L3, L4, and L5 and the spatial coordinates of the measuring point P2. Also, since the position-matched three-dimensional shape signal S1' is the polygon signal, the plane, on which the measuring point P1 is located, and the plane, on which the measuring point P2 is located, can be found easily. Further, from the formula ax+bx+cx+d=0 which defines each plane, each of the normal vectors n1 and n2 can be calculated as (a, b, c). Therefore, the cosine cosθ1 can be calculated from the inner product of the direction vector LiP1 and the normal vector n1, and the cosine cosθ2 can be calculated from the inner product of the direction vector LiP2 and the normal vector n2.

In this embodiment, the face of the person exhibits diffuse reflection. Therefore, the relationships represented by Formulas (3) and (4) shown below obtain among the intensity values of light reflected from the measuring points, the intensity of the illumination, i.e. the intensity of light radiated out from the light source, the surface reflectivity, the light interception, and the cosines described above.

$$I(P1) = k1 \cdot s1 \cdot \cos θ1 \cdot Lc \quad (3)$$

$$I(P2) = k2 \cdot s2 \cdot \cos θ2 \cdot Lc \quad (4)$$

in which I(P1) represents the intensity value of light reflected from the measuring point P1, I(P2) represents the intensity value of light reflected from the measuring point P2, k1 represents the surface reflectivity at the measuring point P1, k2 represents the surface reflectivity at the measuring point P2, s1 represents the value (0 or 1) for the light interception at the measuring point P1, s2 represents the value (0 or 1) for the light interception at the measuring point P2, and Lc represents the intensity of the illumination.

For example, in the cases of the face of the person, an area which is hidden behind the nose and upon which light does not impinge occurs, depending upon the direction of the light source. The state in which light does not impinge upon the area is referred to as the light interception. At the area upon which light does not impinge, the value s for the light interception is equal to 0. At the other areas upon which light impinges and from which the light is reflected, the value s for the light interception is equal to 1. At a measuring point, at which s=0, the intensity value of the reflected light becomes equal to 0. Therefore, in this embodiment, the measuring point, at which s=0, is not utilized for the operation for the estimation of the direction of the light source. In such cases, it often occurs that the measuring points utilized for the operation become insufficient. Accordingly, in cases where the measuring point, at which s=0, is present, a new measuring point, at which s=1, should preferably be set.

The intensity value I(P1) of light reflected from the measuring point P1 and the intensity value I(P2) of light reflected from the measuring point P2 constitute the signal values of the two-dimensional image signal S0 at the measuring points P1 and P2 respectively. In this embodiment, the position matching on the two-dimensional image signal S0 and the three-dimensional shape signal S1 has been performed by the position matching means 1. Therefore, the coordinates of the points on the face image represented by the two-dimensional image signal S0, which points correspond to the measuring points P1 and P2, are calculated from the coordinates of the measuring points P1 and P2 on the three-dimensional shape, which is represented by the position-matched three-dimensional shape signal S1' having been obtained from the position matching with, for example, Formulas (1) and (2) shown above. Also, the signal values of the two-dimensional image signal S0 at the spatial coordinates corresponding to the measuring points P1 and P2 are calculated respectively as the intensity value I(P1) of light reflected from the measuring point P1 and the intensity value I(P2) of light reflected from the measuring point P2.

If the cosine cos θ1 or cos θ2 takes a negative value, the intensity value of the reflected light will become negative. Therefore, in this embodiment, only the measuring points, at which cos θ1, cos θ2>0, are utilized. In such cases, it often occurs that the measuring points utilized for the operation become insufficient. Accordingly, in cases where the measuring points, at which cos θ1, cos θ2≦0, are present, new measuring points, at which cos θ1, cos θ2>0, should preferably be set.

In this embodiment, since the surface reflectivity of the face of the person is approximately uniform, k1=k2 in Formulas (3) and (4) shown above. Also, the values S1 and s2 for the light interception are equal to 1. Further, from Formulas (3) and (4) shown above, the characteristics can be obtained such that, in cases where the position of a virtual light source is correct, i.e. in cases where the position of the virtual light source coincides with the position of the light source, under which the image recording operation was performed, the ratio of the intensity values of the reflected light at the surface of the face and the ratio of the cosines coincide with each other as represented by Formula (5) shown below.

$$Lc \cdot k \cdot s = I(P1)/\cos\theta_1 = I(P2)/\cos\theta_2 \quad (5)$$

in which k represents k1 and k2, s represents s1 and s2, and Lc·k·s takes a fixed value.

Figure 6:
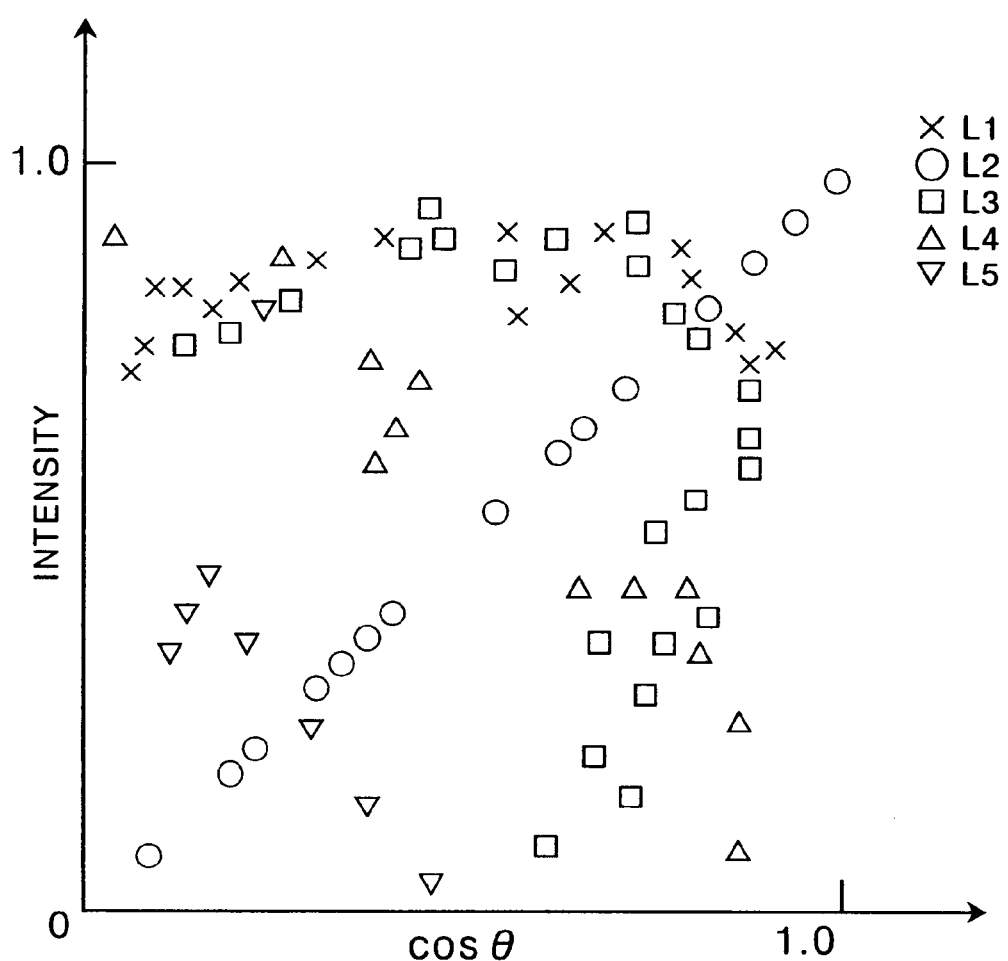
FIG. 6 is a graph showing an example of a relationship between cosines and intensity values of reflected light.

Therefore, in the plotting means 13, as illustrated in FIG. 6, with respect to each of the virtual light sources L1, L2, L3, L4, and L5, the relationship between the intensity values of the light reflected from a plurality of the measuring points P1, P2 and the cosines cos θ1, cos θ2 at the plurality of the measuring points P1, P2 is plotted. In FIG. 6, the intensity values of the reflected light are normalized such that the maximum value of the intensity takes a value of 1.0.

As illustrated in FIG. 6, in cases where the position of the virtual light source L1, L2, L3, L4, or L5 coincides with the position of the light source, under which the image recording operation was performed, from the relationship shown in Formula (5) above, the plotted relationship between the intensity values of the reflected light and the cosines forms a straight line. Therefore, the position of the virtual light source, which is associated with the plotted relationship that forms a straight line, may be taken as the position of the light source, under which the image recording operation was performed. In the example shown in FIG. 6, in cases where the virtual light source located in the direction of −45 degrees, i.e. the virtual light source L2, is employed as the light source, the plotted relationship between the intensity values of the reflected light and the cosines forms a straight line. Therefore, in the direction estimating means 14, the position of the virtual light source L2 is estimated as the position of the light source, under which the image recording operation was performed. Accordingly, it may be estimated that, in the image recording operation, light was irradiated from the direction of −45 degrees, as viewed from the face of the person. The inclination of the straight line is represented by Lc·k·s, and the degree of the inclination can be found from FIG. 6. Therefore, if the inclination is represented by a, the formula Lc=a/k·s is obtained. The intensity Lc of the illumination can thus be calculated.

A judgment as to whether the plotted relationship forms or does not form a straight line may be made in accordance with, for example, an evaluating function utilizing the method of least squares. Specifically, in cases where the formula of the straight line is y=ax+b, the values of a and b can be calculated with Formula (6) shown below.

$$a = \frac{\frac{1}{N}\sum_{n=1}^{N} xn \cdot yn - \left(\frac{1}{N}\sum_{n=1}^{N} xn\right)\left(\frac{1}{N}\sum_{n=1}^{N} yn\right)}{\frac{1}{N}\sum_{n=1}^{N} xn^2 - \left(\frac{1}{N}\sum_{n=1}^{N} xn\right)^2} \quad (6)$$

$$b = \left(\frac{1}{N}\sum_{n=1}^{N} yn\right) - a\left(\frac{1}{N}\sum_{n=1}^{N} xn\right)$$

in which N represents the number of the plotted points, xn represents the value of the cosine, and yn represents the intensity value of the reflected light. Also, from the thus calculated values of a and b, an evaluating function cf represented by Formula (7) shown below is calculated.

$$cf = \frac{1}{N-2}\sum_{n=1}^{N}(yn - b - a \cdot xn)^2 \quad (7)$$

The direction of the virtual light source, which is associated with the value of the evaluating function cf that takes the smallest value, may be estimated as the direction of the light source, under which the image recording operation was performed.

In the example of FIG. 6, wherein environmental light is not taken into consideration, since the straight line passes through the origin, the value of b is 0. In cases where environmental light is taken into consideration, the straight line does not pass through the origin, and b takes a value in accordance with the intensity of the environmental light.

Figure 7:
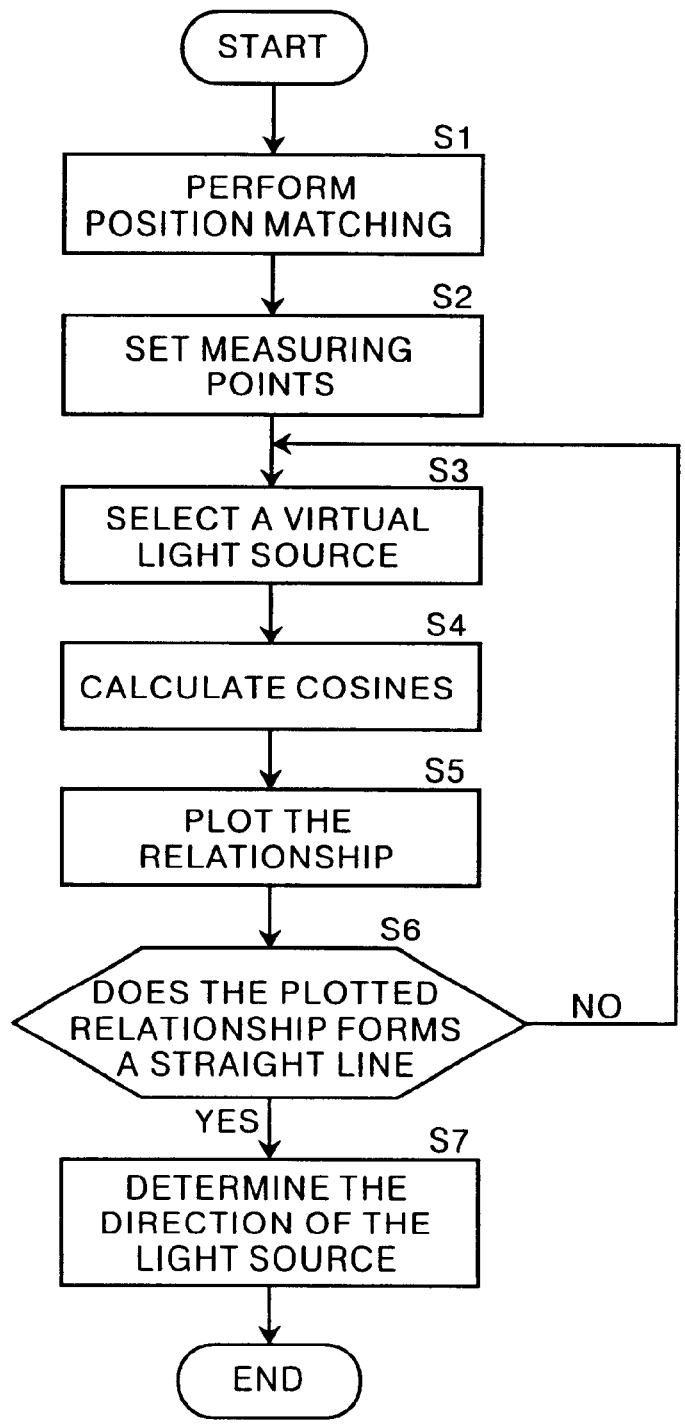
FIG. 7 is a flow chart showing how the first embodiment of the light source direction estimating apparatus in accordance with the present invention operates.

How the first embodiment of the light source direction estimating apparatus in accordance with the present invention operates will be described hereinbelow. FIG. 7 is a flow chart showing how the first embodiment of the light source direction estimating apparatus in accordance with the present invention operates. Firstly, in a step S1, the position matching means 1 performs the position matching on the two-dimensional image signal S0 and the three-dimensional shape signal S1. The composed signal S2 having been obtained from the position matching is fed into the estimation means 3. In a step S2, the estimation means 3 sets a plurality of measuring points on the three-dimensional shape, which is represented by the position-matched three-dimensional shape signal S1' having been obtained from the position matching. Also, in a step S3, the estimation means 3 selects an arbitrary virtual light source from the virtual light source L1, L2, L3, L4, and L5. In this embodiment, by way of example, the virtual light source L1, L2, L3, L4, and L5 are successively selected in this order. In a step S4, the cosine between the direction vector, which is directed from the selected virtual light source to each of the measuring points, and the normal vector at the measuring point is calculated. In a step S5, the relationship between the intensity values of light reflected from the measuring points and the cosines having been calculated for the measuring points is plotted as illustrated in FIG. 6. In a step S6, a judgment is made as to whether the plotted relationship between the intensity values of the reflected light and the cosines forms or does not form a straight line. In cases where it has been judged in the step S6 that the plotted relationship does not form a straight line, the operation is returned to the step S3, a different virtual light source is selected, and the processing from the step S4 to the step S6 is iterated with respect to the different virtual light source. In cases where it has been judged in the step S6 that the plotted relationship forms a straight line, in a step S7, the direction of the virtual light source is determined as the direction of the light source, under which the image recording operation was performed. With the step S7, the processing is finished.

As described above, in the first embodiment, the direction of the light source, under which the image recording operation was performed, is estimated in accordance with the characteristics such that, in cases where the position of a virtual light source is correct, i.e. in cases where the position of the virtual light source coincides with the position of the light source, under which the image recording operation was performed, the ratio of the intensity values of the reflected light at the surface of the face and the ratio of the cosines coincide with each other as represented by Formula (5). Therefore, in the setting of the measuring points, it is sufficient for the conditions that the value s for the light interception is not 0 to be satisfied. Also, the direction of the light source, under which the image recording operation was performed, can be estimated with the comparatively simple operations. Further, in cases where a real image and a virtual image, such as a CG image, are to be combined with each other, the virtual image can be corrected in accordance with the direction of the light source having been estimated from the real image, such that the virtual image is illuminated by an appropriate light source, and the real image and the virtual image can then be combined with each other.

Therefore, a composed image giving no unnatural feeling can be obtained. Furthermore, in an encoding system, such as MPEG-4, wherein an image is transferred with respect to each of objects and image composition is performed at the stage of seeing an animation, in cases where a real image and a virtual image are contained in the objects, the illuminating direction for the virtual image can be corrected in accordance with the illuminating direction for the real image, and the image composition can then be performed. In this manner, a composed animation giving no unnatural feeling can be obtained. Also, in the cases of an image obtained by performing the image recording operation under the sunlight, by the estimation of the direction of the sunlight from the image, rear light compensation and image density compensation with respect to the image can be performed easily.

In the first embodiment described above, as an aid in facilitating the explanation, the virtual light source L1, L2, L3, L4, and L5 are located on the two-dimensional plane. However, actually, a plurality of virtual light sources are located in a three-dimensional pattern with respect to the three-dimensional shape represented by the position-matched three-dimensional shape signal S1', the relationship between the intensity values of light reflected from the measuring points and the cosines at the measuring points is plotted, and the direction of the light source, under which the image recording operation was performed, is thereby estimated.

Also, in the first embodiment described above, as represented by Formulas (6) and (7), the estimation of the direction of the light source, under which the image recording operation was performed, is estimated with the evaluating function cf utilizing the method of least squares. However, the first embodiment is not limited to the use of the evaluating function cf utilizing the method of least squares. Alternatively, the plotted relationships shown in FIG. 6 may be displayed on a monitor, and the operator may see the displayed relationships and may estimate the direction of the virtual light source, which is associated with the plotted relationship that forms a straight line, as the direction of the light source, under which the image recording operation was performed.

The camera, which is utilized for acquiring the two-dimensional image signal S0, exhibits a non-linear relationship between the input light and the image signal obtained as the output. Therefore, it is preferable that a gray chart is recorded previously with the camera which is used, the relationship between the input and the output is calculated with respect to the camera, and the input-output characteristics of the camera are compensated for such that the relationship between the input and the output with respect to the camera becomes linear.

A second embodiment of the light source direction estimating apparatus in accordance with the present invention will be described hereinbelow.

Figure 8:
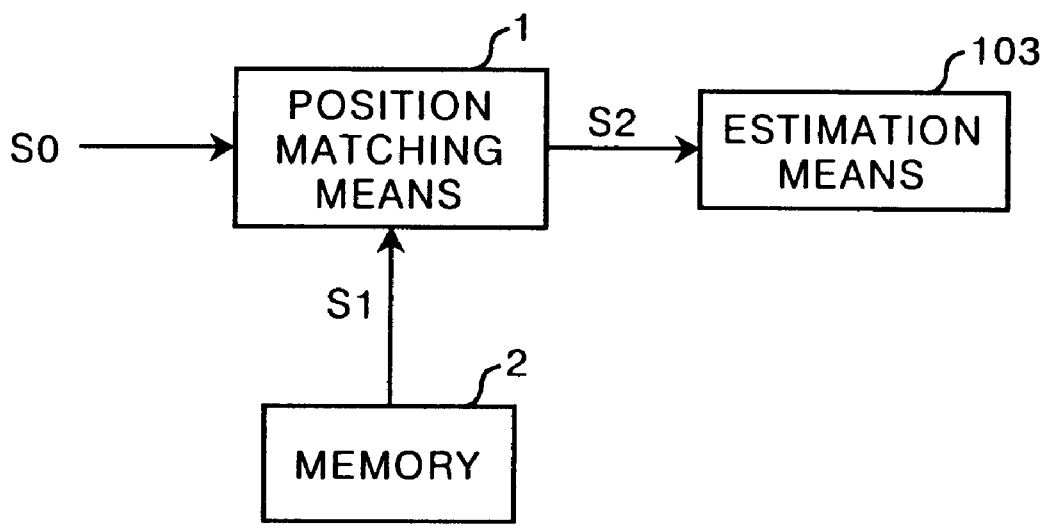
FIG. 8 is a schematic block diagram showing a second embodiment of the light source direction estimating apparatus in accordance with the present invention.

FIG. 8 is a schematic block diagram showing a second embodiment of the light source direction estimating apparatus in accordance with the present invention. In FIG. 8, similar elements are numbered with the same reference numerals with respect to FIG. 1. As illustrated in FIG. 8, the second embodiment of the light source direction estimating apparatus in accordance with the present invention comprises the position matching means 1 for performing position matching on the two-dimensional image signal S0 representing an image, in which an image of a face of a person is embedded, and the three-dimensional shape signal S1, which represents a three-dimensional shape of the face of the person. The composed signal S2 is obtained from the position matching. The second embodiment of the light source direction estimating apparatus in accordance with the present invention also comprises the memory 2 for storing the three-dimensional shape signal S1, and estimation means 103 for estimating directions of light sources, under which an operation for recording the image represented by the two-dimensional image signal S0 was performed, from the image, in which the image of the face of the person is embedded, in accordance with the composed signal S2. In the second embodiment, the directions of a plurality of light sources are estimated. Also, the flesh-color area of the face of the person has approximately uniform surface reflectivity and exhibits diffuse reflection.

In the same manner as that in the first embodiment described above, the position matching means 1 performs the position matching on the two-dimensional image signal S0, which represents the image of the face of the person shown in FIG. 2A, and the three-dimensional shape signal S1, which represents the three-dimensional shape of the face of the person shown in FIG. 2B. Also, as in the first embodiment described above, alteration of the orientation, the size, and the center position of the three-dimensional shape can be performed on the three-dimensional shape signal S1 and in accordance with the face image represented by the two-dimensional image signal S0. The three-dimensional shape signal S1 is a polygon signal, which defines the three-dimensional shape with a plurality of planes.

Figure 9:
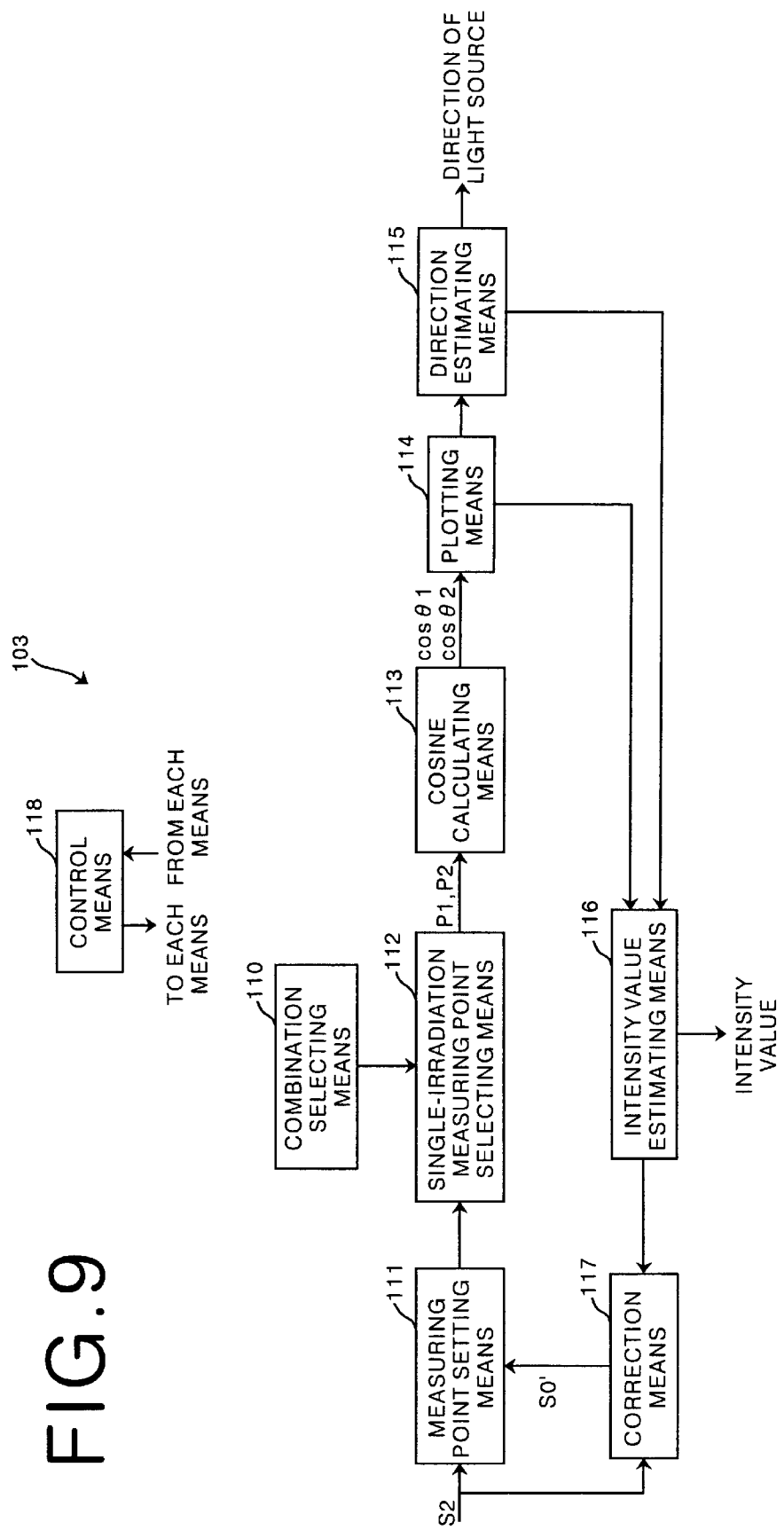
FIG. 9 is a schematic block diagram showing estimation means employed in the second embodiment of the light source direction estimating apparatus in accordance with the present invention.

FIG. 9 is a schematic block diagram showing the estimation means 103 employed in the second embodiment of the light source direction estimating apparatus in accordance with the present invention. As illustrated in FIG. 9, the estimation means 103 comprises combination selecting means 110 for selecting combinations of virtual light sources from the virtual light sources having been set in the plurality of the arbitrary directions. The estimation means 103 also comprises measuring point setting means 111 for setting a plurality of measuring points on the three-dimensional shape, which is represented by the position-matched three-dimensional shape signal S1' that has been obtained from the position matching. The estimation means 103 further comprises single-irradiation measuring point selecting means 112 for selecting single-irradiation measuring points, which are exposed to only light radiated out from a single virtual light source when light is irradiated from the virtual light sources constituting the selected combination to the three-dimensional shape, i.e. the face image, from the plurality of the measuring points and in accordance with the two-dimensional image signal S0. The estimation means 103 still further comprises cosine calculating means 113 for calculating a cosine between a direction vector, which is directed from the single virtual light source to each of the single-irradiation measuring points, and a normal vector at each of the single-irradiation measuring point. The estimation means 103 also comprises plotting means 114 for plotting a relationship between the calculated cosines and signal values of the two-dimensional image signal S0, which signal values correspond to the single-irradiation measuring points, with respect to each of the directions of the virtual light sources. The estimation means 103 further comprises direction estimating means 115 for estimating a direction of a virtual light source, which direction is associated with a plotted relationship that forms an approximately straight line, as a direction of one light source among the light sources, under which the image recording operation was performed. The estimation means 103 still further comprises intensity value estimating means 116 for estimating a relative intensity value of light radiated out from the one light source in accordance with an inclination of a straight line, which is set by the plotted relationship utilized for the estimation of the direction of the one light source. The estimation means 103 also comprises correction means 117 for removing effects of light, which is radiated out from the one light source, from the two-dimensional image signal S0, which has been subjected to the position matching, in accordance with the relative intensity value of light radiated out from the one light source, to acquire a corrected two-dimensional image signal S0'. The estimation means 103 further comprises control means 118 for controlling the combination selecting means 110, the measuring point setting means 111, the single-irradiation measuring point selecting means 112, the cosine calculating means 113, the plotting means 114, the direction estimating means 115, the intensity value estimating means 116, and the correction means 117, such that the selection of combinations of virtual light sources from the virtual light sources other than the virtual light source located in the direction of the one light source, the selection of single-irradiation measuring points in accordance with the corrected two-dimensional image signal S0' being employed as a new two-dimensional image signal S0, the calculation of cosines, the plotting, the estimation of a direction of one light source, the estimation of a relative intensity value of light radiated out from the one light source, and the acquisition of a corrected two-dimensional image signal S0', are iterated till directions of all of the light sources, under which the image recording operation was performed, are estimated.

Figure 10:
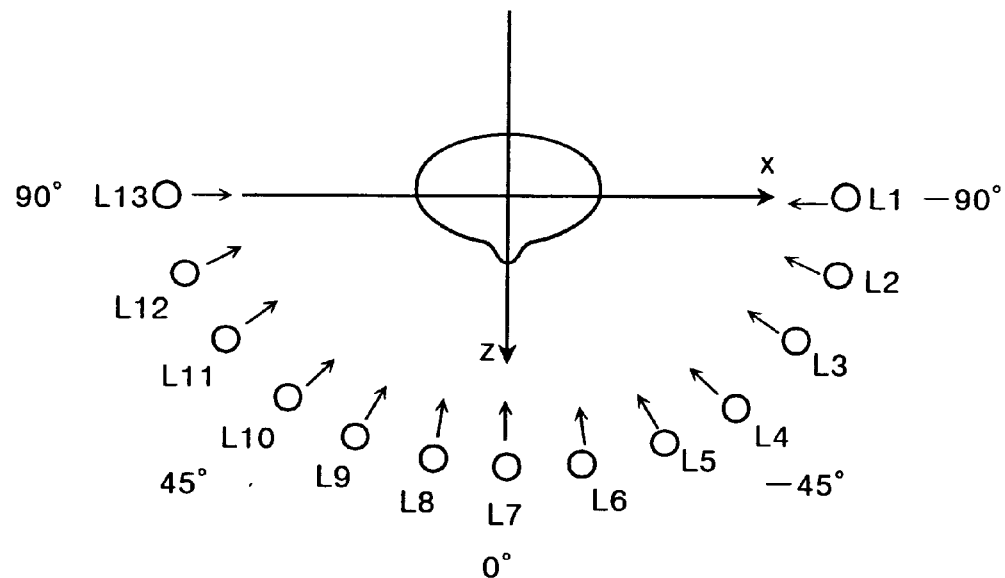
FIG. 10 is an explanatory view showing virtual light sources, which are set in a plurality of directions in the second embodiment of the light source direction estimating apparatus in accordance with the present invention.
Figure 11:
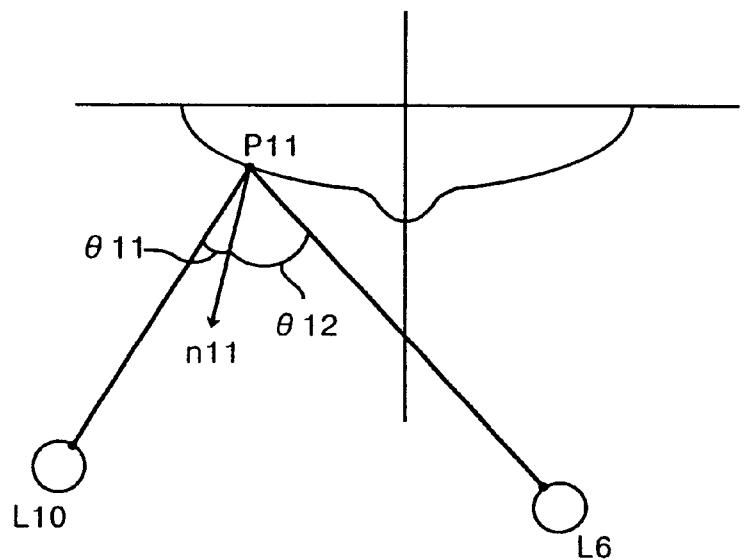
FIG. 11 is an explanatory view showing how cosines at measuring points are calculated.

In the estimation means 103, the directions of the light sources are estimated in the manner described below. FIG. 10 is an explanatory view showing virtual light sources, which are set in a plurality of directions in the second embodiment of the light source direction estimating apparatus in accordance with the present invention. FIG. 11 is an explanatory view showing how cosines at measuring points are calculated. FIG. 10 is a cross-sectional view taken along a plane, which is normal to the y axis, in the three-dimensional shape represented by the position-matched three-dimensional shape signal S1'. As an aid in facilitating the explanation, the estimation of the directions of the light sources is explained with the two-dimensional view shown in FIG. 10. Firstly, in the combination selecting means 110, thirteen virtual light sources L1 to L13 are located at intervals of 15 degrees in the range of −90 degrees to +90 degrees around the y axis, and combinations of a certain number of virtual light sources are selected successively from the thirteen virtual light sources L1 to L13. The selection of the combinations is performed successively beginning with combinations of a small number of (two) virtual light sources. In this embodiment, by way of example, all of combinations of two virtual light sources are selected from the thirteen virtual light sources L1 to L13. In such cases, the number of the combinations is equal to $_{13}C_2=78$. Thereafter, in the measuring point setting means 111, a plurality of measuring points are set on the three-dimensional shape, which is represented by the position-matched three-dimensional shape signal S1'. The measuring points are set at an area on the three-dimensional shape represented by the position-matched three-dimensional shape signal S1', which area corresponds to the flesh-color area of the face of the person.

In the single-irradiation measuring point selecting means 112, the single-irradiation measuring points are selected in the manner described below. Firstly, as for every combination of the virtual light sources, a direction vector, which is directed from each virtual light source to each of the measuring points, and a normal vector at the measuring point are calculated, and a cosine between the direction vector and the normal vector is calculated. For example, as illustrated in FIG. 11, in cases where the combination of the virtual light sources is composed of the virtual light sources L6 and L10, as for a measuring point P11, a calculation is made to find a direction vector L6P11, which is directed from the virtual light source L6 to the measuring point P11, and a direction vector L10P11, which is directed from the virtual light source L10 to the measuring point P11. Also, a normal vector n11 at the measuring point P11 is calculated. Further, a calculation is made to find a cosine $\cos \theta 11$ between the direction vector L10P11 and the normal vector n11, and a cosine $\cos \theta 12$ between the direction vector L6P11 and the normal vector n11. Since the spatial coordinates of the virtual light sources L1 to L13 and the spatial coordinates of the measuring points can be found previously, the direction vector can be calculated from the coordinates of each of the virtual light sources L1 to L13 and the spatial coordinates of each measuring point. Also, since the position-matched three-dimensional shape signal S1' is the polygon signal, the plane, on which the measuring point is located, can be found easily. Further, from the formula $ax+bx+cx+d=0$ which defines each plane, the normal vector can be calculated as $(a, b, c)$. Therefore, as illustrated in FIG. 11, the cosine $\cos \theta 11$ can be calculated from the inner product of the direction vector L10P11 and the normal vector n11, and the cosine $\cos \theta 12$ can be calculated from the inner product of the direction vector L6P11 and the normal vector n11. The calculations of the cosines are made with respect to all of the combinations of the virtual light sources.

Figure 12:
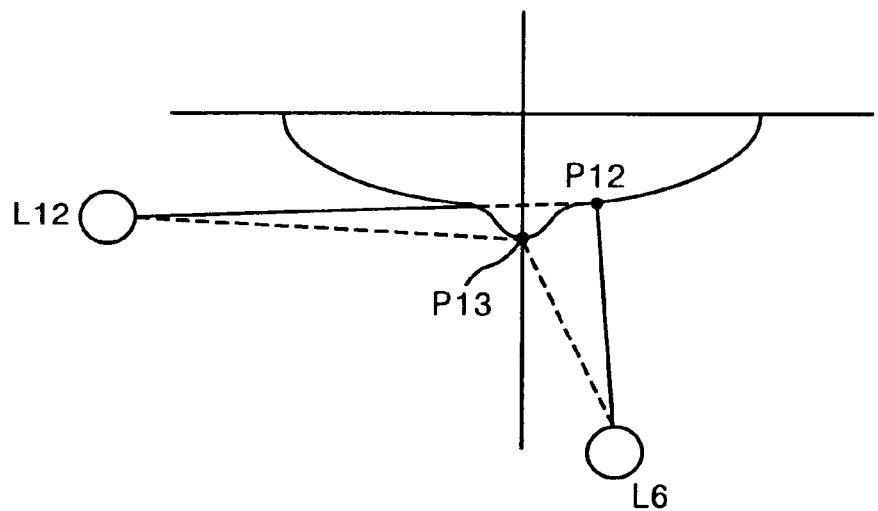
FIG. 12 is an explanatory view showing how light interception occurs.

Thereafter, with respect to each combination of the virtual light sources, the single-irradiation measuring points, which are exposed to only light radiated out from a single virtual light source when light is irradiated from the virtual light sources constituting the combination to the three-dimensional shape, are selected. The judgment as to whether a measuring point is or is not exposed to only the light radiated out from a single virtual light source is made by judging whether the light from the other virtual light source in each combination of the virtual light sources is or is not intercepted, or whether the cosine between the direction vector from the other virtual light source to the measuring point and the normal vector at the measuring point takes or does not take a negative value. For example, in the cases of the face of the person as in the second embodiment, an area which is hidden behind the nose and upon which light does not impinge occurs, depending upon the direction of the light source. The state in which light does not impinge upon the area is referred to as the light interception. Specifically, as illustrated in FIG. 12, in the cases of the combination of the virtual light sources L6 and L12, the light radiated out from the virtual light source L6 and the light radiated out from the virtual light source L12 impinge upon a point P13. However, at a point P12, the light radiated out from the virtual light source L12 is intercepted by the nose, and therefore only the light radiated out from the virtual light source L6 impinges upon the point P12.

Figure 13:
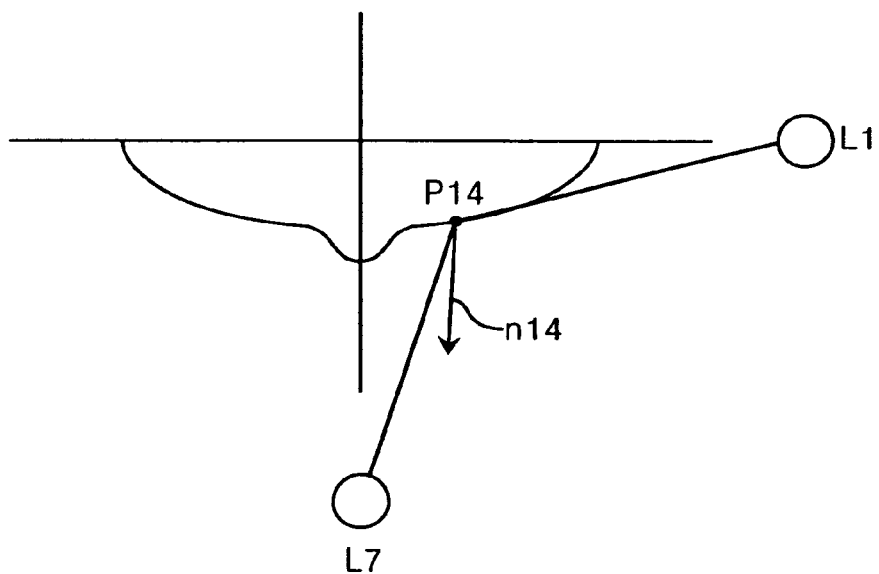
FIG. 13 is an explanatory view showing the cases where a cosine takes a negative value.

Also, as illustrated in FIG. 13, in the cases of the combination of the virtual light sources L1 and L7, the angle made between a direction vector, which is directed from the virtual light source L7 to a point P14, and a normal vector n14 at the point P14 is an acute angle. Therefore, the cosine between the direction vector, which is directed from the virtual light source L7 to the point P14, and the normal vector n14 at the point P14 takes a positive value. However, the angle made between a direction vector, which is directed from the virtual light source L1 to the point P14, and the normal vector n14 at the point P14 is an obtuse angle. Therefore, the cosine between the direction vector, which is directed from the virtual light source L1 to the point P14, and the normal vector n14 at the point P14 takes a negative value. The negative cosine value indicates that the light radiated out from the virtual light source L1 is intercepted by part of the face and does not impinge upon the point P14.

Therefore, the measuring point, at which the light interception occurs or at which the cosine between the direction vector from the other virtual light source and the normal vector at the measuring point takes a negative value, is the measuring point which is exposed to only the light radiated out from a single virtual light source. Such a measuring point is selected as the single-irradiation measuring point.

Figure 14:
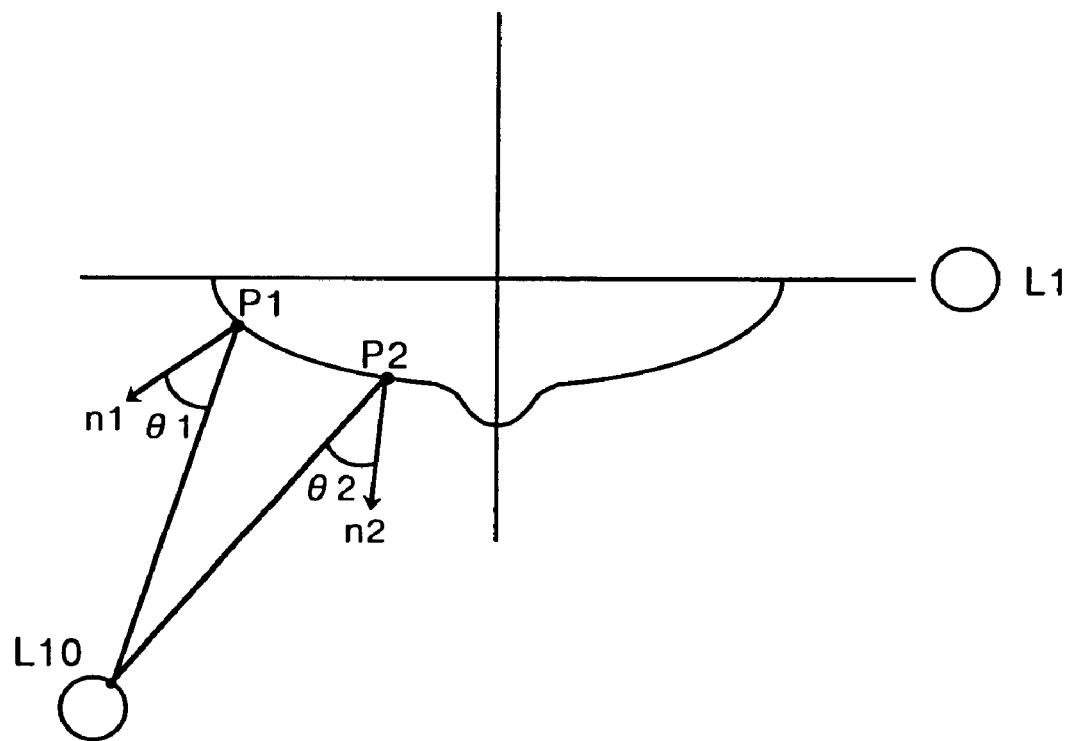
FIG. 14 is an explanatory view showing how cosines at measuring points are calculated with respect to a single virtual light source.

Thereafter, in the cosine calculating means 113, with respect to each combination of the virtual light sources, a calculation is made to find the cosine between the direction vector, which is directed from the single virtual light source to each of the single-irradiation measuring points, and the normal vector at each of the single-irradiation measuring point. Specifically, as illustrated in FIG. 14, with respect to the combination of the virtual light sources L1 and L10, the measuring points P1 and P2 are the single-irradiation measuring points, upon which only the light radiated out from the virtual light source L10 impinges. Therefore, in this case, the virtual light source L10 is the single virtual light source. Accordingly, with respect to the single-irradiation measuring points P1 and P2, a calculation is made to find a direction vector L10P1, which is directed from the single virtual light source L10 to the measuring point P1, and a direction vector L10P2, which is directed from the single virtual light source L10 to the measuring point P2. Also, a calculation is made to find a normal vector n1 at the measuring point P1 and a normal vector n2 at the measuring point P2. Thereafter, a calculation is made to find a cosine $\cos\theta_1$ between the direction vector L10P1 and the normal vector n1, and a cosine $\cos\theta_2$ between the direction vector L10P2 and the normal vector n2. However, at this time, the cosine values need not be calculated again, and the cosine values, which have been calculated at the time of the selection of the single-irradiation measuring points in the cosine calculating means 12, may be utilized.

In the second embodiment, the face of the person exhibits diffuse reflection. Therefore, the relationships represented by Formulas (3) and (4) shown below obtain among the intensity values of light reflected from the measuring points, the intensity of the illumination, i.e. the intensity of light radiated out from the light source, the surface reflectivity, the light interception, and the cosines described above.

$$I(P1)=k1 \cdot s1 \cdot \cos\theta_1 \cdot Lc \tag{3}$$

$$I(P2)=k2 \cdot s2 \cdot \cos\theta_2 \cdot Lc \tag{4}$$

in which I(P1) represents the intensity value of light reflected from the measuring point P1, I(P2) represents the intensity value of light reflected from the measuring point P2, k1 represents the surface reflectivity at the measuring point P1, k2 represents the surface reflectivity at the measuring point P2, s1 represents the value (0 or 1) for the light interception at the measuring point P1, s2 represents the value (0 or 1) for the light interception at the measuring point P2, and Lc represents the intensity of the illumination.

In the second embodiment, the single-irradiation measuring points are the points, upon which the light radiated out from the single virtual light source impinges, and therefore no light interception occurs at the single-irradiation measuring points. Therefore, as for the single-irradiation measuring points, the values for the light interception is equal to 1. Also, at the single-irradiation measuring points, the cosine $\cos\theta$ takes a positive value. Therefore, the cosines $\cos\theta_1$ and $\cos\theta_2$ take positive values. Further, the intensity value I(P1) of light reflected from the measuring point P1 and the intensity value I(P2) of light reflected from the measuring point P2 constitute the signal values of the two-dimensional image signal S0 at the measuring points P1 and P2 respectively. In the second embodiment, the position matching on the two-dimensional image signal S0 and the three-dimensional shape signal S1 has been performed by the position matching means 1. Therefore, the coordinates of the points on the face image represented by the two-dimensional image signal S0, which points correspond to the single-irradiation measuring points P1 and P2, are calculated from the coordinates of the single-irradiation measuring points P1 and P2 on the three-dimensional shape, which is represented by the position-matched three-dimensional shape signal S1' having been obtained from the position matching with, for example, Formulas (1) and (2) shown above. Furthermore, the signal values of the two-dimensional image signal S0 at the spatial coordinates corresponding to the single-irradiation measuring points P1 and P2 are calculated respectively as the intensity value I(P1) of light reflected from the single-irradiation measuring point P1 and the intensity value I(P2) of light reflected from the single-irradiation measuring point P2.

In the second embodiment, since the surface reflectivity of the face of the person is approximately uniform, k1=k2 in Formulas (3) and (4) shown above. Also, the values S1 and s2 for the light interception are equal to 1. Further, from Formulas (3) and (4) shown above, the characteristics can be obtained such that, in cases where the position of a single virtual light source is correct, i.e. in cases where the position of the single virtual light source coincides with the position of one of the light sources, under which the image recording operation was performed, the ratio of the intensity values of the reflected light at the surface of the face and the ratio of the cosines coincide with each other as represented by Formula (5) shown below.

$$Lc \cdot k \cdot s = I(P1)/\cos\theta_1 = I(P2)/\cos\theta_2 \tag{5}$$

in which k represents k1 and k2, s represents s1 and s2, and Lc·k·s takes a fixed value.

Figure 15:
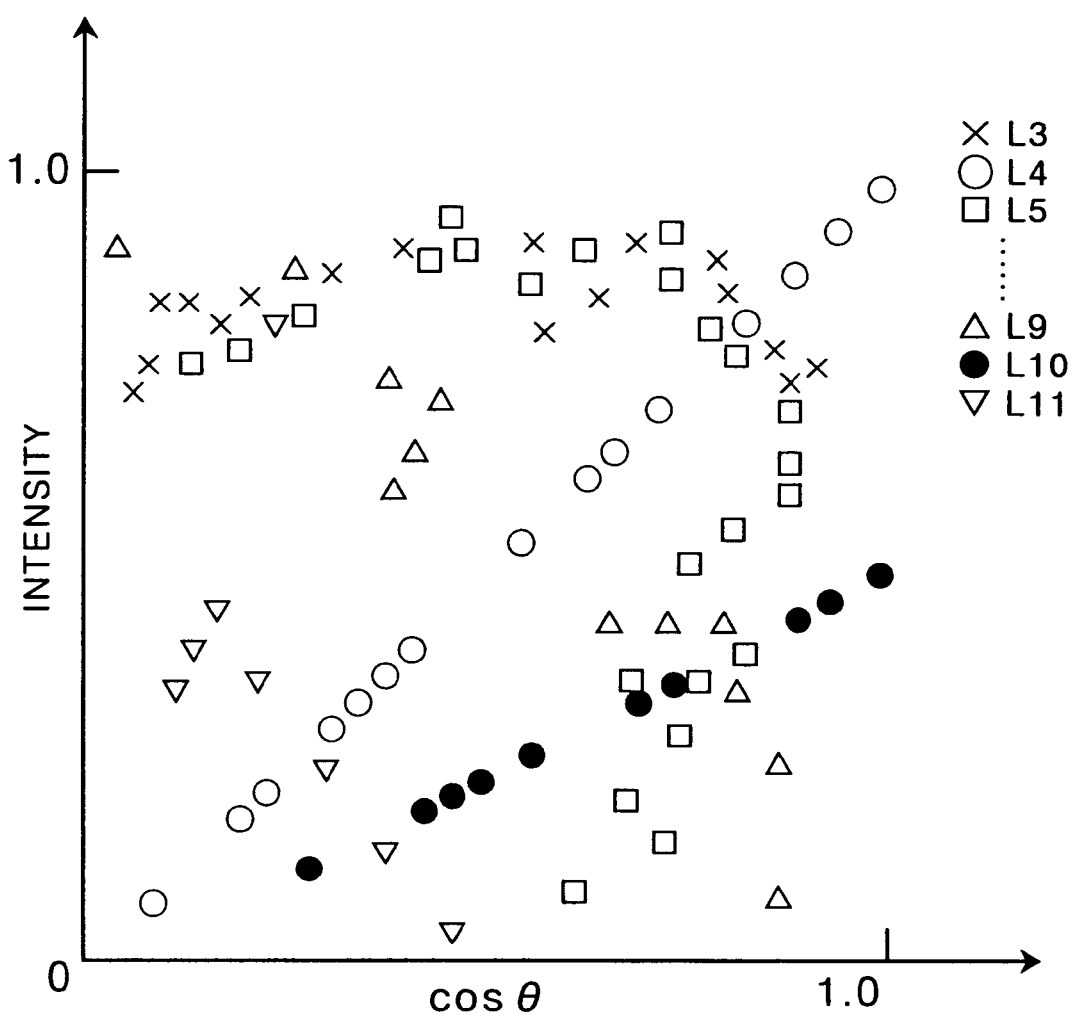
FIG. 15 is a graph showing an example of a relationship between cosines and intensity values of reflected light.

Therefore, in the plotting means 114, as illustrated in FIG. 15, with respect to each of the single virtual light sources in the combinations of the virtual light sources, the relationship between the intensity values of the light reflected from the single-irradiation measuring points and the cosines at the single-irradiation measuring points is plotted. In FIG. 15, the intensity values of the reflected light are normalized such that the maximum value of the intensity takes a value of 1.0. Also, in FIG. 15, as an aid in facilitating the explanation, the relationship described above is plotted with respect to only the single virtual light sources L3, L4, L5, L9, L10, and L11.

As illustrated in FIG. 15, in cases where the position of one of the virtual light sources L1 to L13 coincides with the position of one of the light sources, under which the image recording operation was performed, from the relationship shown in Formula (5) above, the plotted relationship between the intensity values of the reflected light and the cosines forms a straight line. Therefore, the position of the virtual light source, which is associated with the plotted relationship that forms a straight line, may be taken as the position of the light source, under which the image recording operation was performed. In the example shown in FIG. 15, in cases where the virtual light source located in the direction of −45 degrees, i.e. the virtual light source L4, is employed as the light source, and in cases where the virtual light source located in the direction of +45 degrees, i.e. the virtual light source L10, is employed as the light source, the plotted relationship between the intensity values of the reflected light and the cosines forms a straight line. Therefore, in the direction estimating means 115, the positions of the virtual light sources L4 and L10 are estimated as the positions of the light sources, under which the image recording operation was performed. Accordingly, it may be estimated that, in the image recording operation, light was irradiated from the directions of −45 degrees and +45 degrees, as viewed from the face of the person. The inclinations of the straight lines are represented by Lc·k·s, and the degrees of the inclinations can be found from FIG. 15. Therefore, in the intensity value estimating means 116, if each of the inclinations is represented by a, the formula Lc=a/k·s is obtained. The intensity Lc of each light source can thus be calculated. By way of example, in the example shown in FIG. 15, the inclination of the relationship plotted for the virtual light source L4 is calculated to be 0.903, and the inclination of the relationship plotted for the virtual light source L10 is calculated to be 0.448. Since the surface reflectivity is approximately uniform, from the values described above, the relative intensity values of the light sources located in the directions of the virtual light sources L4 and L10 can be calculated. In cases where the surface reflectivity k of the object is known, the absolute intensity of light radiated out from each of the light sources can also be estimated.

A judgment as to whether the plotted relationship forms or does not form a straight line may be made in accordance with, for example, an evaluating function utilizing the method of least squares. Specifically, in cases where the formula of the straight line is y=ax+b, the values of a and b can be calculated with Formula (6) shown below.

$$a = \frac{\frac{1}{N}\sum_{n=1}^{N} xn \cdot yn - \left(\frac{1}{N}\sum_{n=1}^{N} xn\right)\left(\frac{1}{N}\sum_{n=1}^{N} yn\right)}{\frac{1}{N}\sum_{n=1}^{N} xn^2 - \left(\frac{1}{N}\sum_{n=1}^{N} xn\right)^2} \quad (6)$$

$$b = \left(\frac{1}{N}\sum_{n=1}^{N} yn\right) - a\left(\frac{1}{N}\sum_{n=1}^{N} xn\right)$$

in which N represents the number of the plotted points, xn represents the value of the cosine, and yn represents the intensity value of the reflected light. Also, from the thus calculated values of a and b, an evaluating function cf represented by Formula (7) shown below is calculated.

$$cf = \frac{1}{N-2}\sum_{n=1}^{N}(yn - b - a \cdot xn)^2 \quad (7)$$

The direction of each virtual light source, which is associated with the value of the evaluating function cf that takes the smallest value, may be estimated as the direction of each of the light sources, under which the image recording operation was performed.

The product Lc·k of the thus calculated intensity value Lc and the surface reflectivity k, i.e. the inclination of the straight line formed by the plotted relationship, represents the intensity values of the light, which has been radiated out from each of the light sources and reflected from the respective points on the face image represented by the two-dimensional image signal S0. Therefore, in the correction means 117, the intensity value of the reflected light of the light radiated out from one of the light sources, under which the image recording operation was performed, is calculated for every pixel position in the face image represented by the two-dimensional image signal S0. Also, the intensity values having thus been calculated for the respective pixels are subtracted from the signal values of the two-dimensional image signal S0, which signal values represent the corresponding pixels. In this manner, the corrected two-dimensional image signal S0', which represents an image formed with only the light radiated out from the other light source, can be obtained.

In the example of FIG. 15, wherein environmental light is not taken into consideration, since the straight line passes through the origin, the value of b is 0. In cases where environmental light is taken into consideration, the straight line does not pass through the origin, and b takes a value in accordance with the intensity of the environmental light.

In cases where the number of the light sources, under which the image recording operation was performed, is two, if the number of the virtual light sources constituting the selected combination is two, the directions of the light sources, under which the image recording operation was performed, can be estimated with single plotting. In the ordinary cases, the estimation means 103 may operate in the manner described below. Specifically, with respect to each of the combinations of the virtual light sources, which combinations have been selected successively from all of the set virtual light sources, beginning with combinations of a small number of virtual light sources, the calculation of the cosines, the selection of the single-irradiation measuring points, the plotting in accordance with the single virtual light sources, and the judgment as to whether the plotted relationship forms or does not form a straight line are performed. When the direction of a certain single virtual light source, which is associated with the plotted relationship that forms a straight line, is firstly estimated as the direction of one of the light sources, under which the image recording operation was performed, the intensity values of the reflected light of the light radiated out from the one estimated light source are calculated for respective pixel positions in the face image represented by the two-dimensional image signal S0. Also, the intensity values having thus been calculated for the respective pixels are subtracted from the signal values of the two-dimensional image signal S0, which signal values represent the corresponding pixels. The corrected two-dimensional image signal S0', which represents an image formed with only the light radiated out from the other light source, is thereby obtained. In accordance with the corrected two-dimensional image signal S0', the selection of the combinations of the virtual light sources, the calculation of the cosines, the selection of the single-irradiation measuring points, the plotting in accordance with the single virtual light source, the judgment as to whether the plotted relationship forms or does not form a straight line, and the estimation of the light source, under which the image recording operation was performed, are iterated. In this manner, the directions of all of the light sources, under which the image recording operation was performed, may be estimated.

In order to perform the processing described above, the control means 118 controls the combination selecting means 110, the measuring point setting means 111, the single-irradiation measuring point selecting means 112, the cosine calculating means 113, the plotting means 114, the direction estimating means 115, the intensity value estimating means 116, and the correction means 117.

Figure 16:
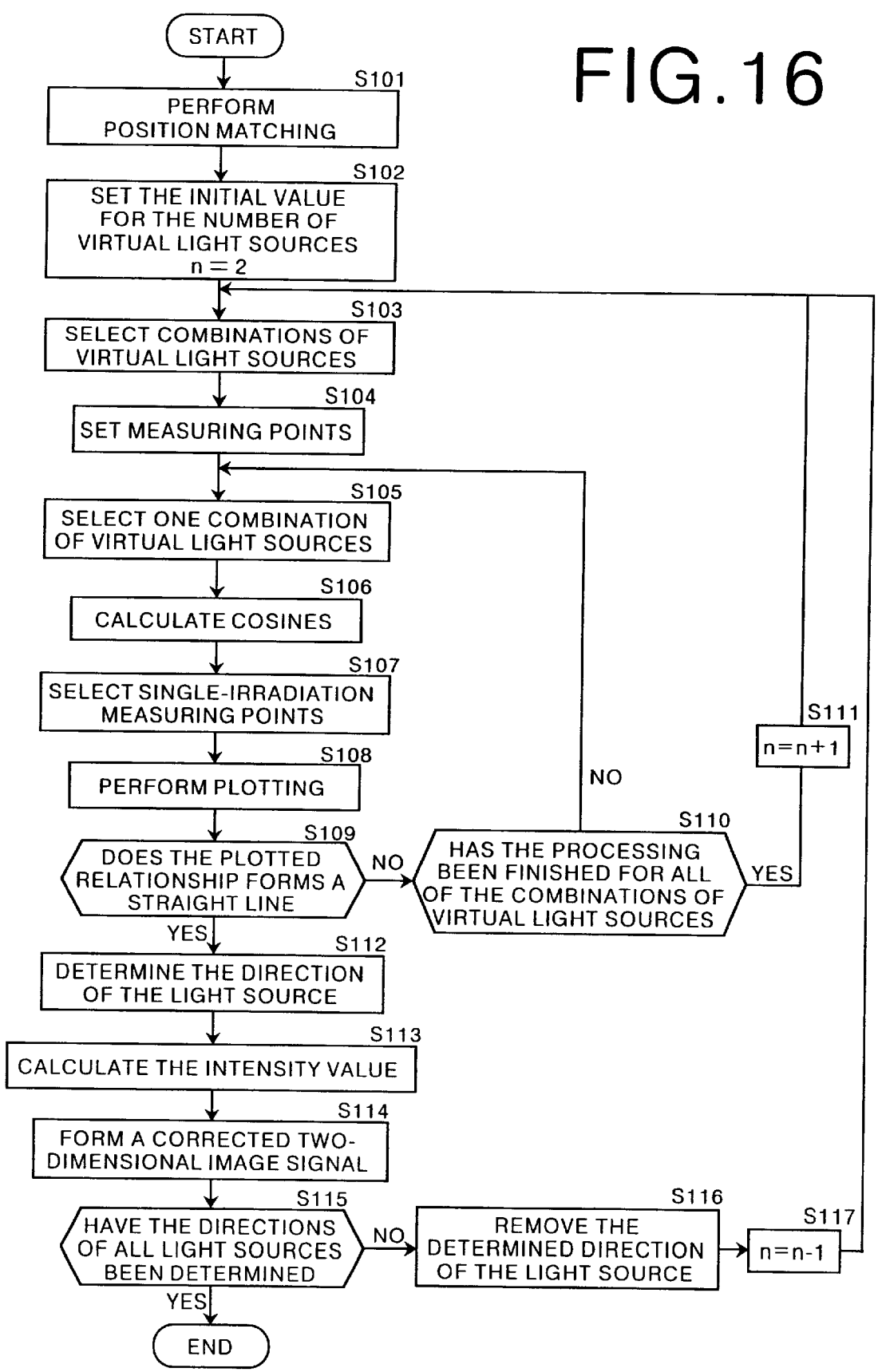
FIG. 16 is a flow chart showing how the second embodiment of the light source direction estimating apparatus in accordance with the present invention operates.

How the second embodiment of the light source direction estimating apparatus in accordance with the present invention operates will be described hereinbelow. FIG. 16 is a flow chart showing how the second embodiment of the light source direction estimating apparatus in accordance with the present invention operates. Firstly, in a step S101, the position matching means 1 performs the position matching on the two-dimensional image signal S0 and the three-dimensional shape signal S1. The composed signal S2 having been obtained from the position matching is fed into the estimation means 103. In a step S102, the estimation means 103 sets an initial value of the number n of the virtual light sources, which initial value is to be utilized in selecting the combinations of the virtual light sources from a plurality of virtual light sources. In this embodiment, the initial value is set at 2. Also, in a step S103, the combinations of the virtual light sources are selected from the plurality of the virtual light sources. Thereafter, in a step S104, a plurality of measuring points are set on the three-dimensional shape, which is represented by the position-matched three-dimensional shape signal S1' having been obtained from the position matching. In a step S105, one arbitrary combination is selected from the combinations of the virtual light sources. In this embodiment, the combination of the virtual light sources L1 and L2, the combination of the virtual light sources L1 and L3, the combination of the virtual light sources L1 and L4, . . . , the combination of the virtual light sources L8 and L10, and the combination of the virtual light sources L9 and L10, are successively selected in this order.

Thereafter, in a step S106, as for the selected combination of the virtual light sources, the direction vector, which is directed from each virtual light source to each of the measuring points, and the normal vector at the measuring point are calculated, and the cosine between the direction vector and the normal vector is calculated. Also, in a step S107, the single-irradiation measuring points are selected in accordance with the values of the thus calculated cosines and whether the light interception occurs or does not occur. Further, in a step S108, as illustrated in FIG. 15, the relationship between the intensity values of the light reflected from the single-irradiation measuring points and the cosines at the single-irradiation measuring points is plotted. In a step S109, a judgment is then made as to whether the plotted relationship between the intensity values of the reflected light and the cosines forms or does not form a straight line. In cases where it has been judged in the step S109 that the plotted relationship does not form a straight line, in a step S110, a judgment is made as to whether the processing from the step S105 to the step S109 has been or has not been finished with respect to all of the combinations of the virtual light sources, which combinations have been selected in the step S103. In cases where it has been judged in the step S110 that the processing from the step S105 to the step S109 has not been finished with respect to all of the combinations of the virtual light sources, the operation is returned to the step S105, the next combination of the virtual light sources is selected, and the processing from the step S105 to the step S109 is iterated with respect to the next combination of the virtual light source. In cases where it has been judged in the step S110 that the processing from the step S105 to the step S109 has been finished with respect to all of the combinations of the virtual light sources, in a step S111, a value of 1 is added to the initial value of the number n of the virtual light sources, the operation is returned to the step S103, and the processing from the step S103 to the step S109 is iterated. In cases where it has been judged in the step S109 that the plotted relationship forms a straight line, in a step SI 12, the direction of the virtual 5 light source is determined as the direction of one of the light sources, under which the image recording operation was performed.

Thereafter, in a step S113, the intensity value of light, which is radiated out from the light source located in the determined direction of the light source, is calculated from the inclination of the straight line, which is formed by the plotted relationship. In a step S114, the corrected two-dimensional image signal S0' is then formed in accordance with the intensity value of light, which is radiated out from the light source located in the determined direction of the light source. Also, in a step S115, a judgment is made as to whether the directions of all of the light sources, under which the image recording operation was performed, have been or have not been determined. Specifically, the judgment is made by plotting, with respect to the corrected two-dimensional image signal S0', the relationship between the intensity values of light reflected from the single-irradiation measuring points and the cosines described above, and judging whether the plotted relationship forms or does not form a straight line parallel with the cosine axis, i.e. whether the intensity values of light reflected from the single-irradiation measuring points are or are not equal to a predetermined value. In cases where it has been judged in the step S115 that the directions of all of the light sources, under which the image recording operation was performed, have not been determined, in a step S116, the light source located in the determined direction of the light source is removed from the combination of the virtual light sources. Also, in a step S117, a value of 1 is subtracted from the initial value. The operation is returned to the step S103, and the processing from the step S103 to the step S115 is iterated. In such cases, in the step S103, the combinations of the virtual light sources are set. At this time, since the direction of one light source has already been determined, in cases where the initial value is 2, each combination is constituted of only one virtual light source. In cases where it has been judged in the step S115 that the directions of all of the light sources, under which the image recording operation was performed, have been determined, the processing is finished.

As described above, in the second embodiment, the direction of each of the light sources, under which the image recording operation was performed, is estimated in accordance with the characteristics such that, in cases where the position of a virtual light source is correct, i.e. in cases where the position of the virtual light source coincides with the position of one of the light sources, under which the image recording operation was performed, the ratio of the intensity values of the reflected light at the surface of the face and the ratio of the cosines coincide with each other as represented by Formula (5). Therefore, in cases where, after the plurality of the measuring points have been set, the single-irradiation measuring points, upon which only the light radiated out from one light source impinges, are set in accordance with the values of the cosines described above and the light interception, the direction of each of the light sources, under which the image recording operation was performed, can be estimated with comparatively simple operations. Further, in cases where a real image and a virtual image, such as a CG image, are to be combined with each other, the virtual image can be corrected in accordance with the directions of the plurality of the light sources having been estimated from the real image, such that the virtual image is illuminated by appropriate light sources, and the real image and the virtual image can then be combined with each other. Therefore, a composed image giving no unnatural feeling can be obtained. Furthermore, in an encoding system, such as MPEG-4, wherein an image is transferred with respect to each of objects and image composition is performed at the stage of seeing an animation, in cases where a real image and a virtual image are contained in the objects, the illuminating direction for the virtual image can be corrected in accordance with the illuminating direction for the real image, and the image composition can then be performed. In this manner, a composed animation giving no unnatural feeling can be obtained.

Also, with the second embodiment, wherein the relative intensity values of light radiated out from the light sources, under which the image recording operation was performed, are also estimated, in cases where a real image and a virtual image are combined with each other in the manner described above, the virtual image can also be corrected in accordance with the relative intensity values of light radiated out from the light sources, which relative intensity values have been estimated from the real image, such that the virtual image is illuminated with light having an appropriate intensity, and the real image and the virtual image can then be combined with each other. Therefore, a composed image giving no unnatural feeling can be obtained.

Further, with the second embodiment, wherein the intensity values of light radiated out from the light sources, under which the image recording operation was performed, are also estimated, with respect to an image having been obtained by performing the image recording operation under a plurality of different light sources, the effects of only a light source located in a specific direction can be compensated for. For example, in cases where the two-dimensional image signal S0 is composed of red (R), green (G), and blue (B) color signals, the intensity value of light radiated out from the light source may be estimated with respect to each of the color signals. In this manner, the ratio among the intensity values of the R, G, and B color components of the light radiated out from the light source can be calculated. Therefore, for example, it is possible to perform processing for compensating for the effects of only a light source radiating out light, in which the intensity of a specific color component (e.g., the R component) is higher than the intensities of the other color components.

In the second embodiment described above, as an aid in facilitating the explanation, the virtual light source L1 to L13 are located on the two-dimensional plane. However, actually, a plurality of virtual light sources are located in a three-dimensional pattern with respect to the three-dimensional shape represented by the position-matched three-dimensional shape signal S1', the relationship between the intensity values of light reflected from the measuring points and the cosines at the measuring points is plotted, and the direction of each of the light sources, under which the image recording operation was performed, is thereby estimated.

Also, in the second embodiment described above, as represented by Formulas (6) and (7), the estimation of the direction of each of the light sources, under which the image recording operation was performed, is estimated with the evaluating function cf utilizing the method of least squares. However, the second embodiment is not limited to the use of the evaluating function cf utilizing the method of least squares. Alternatively, the plotted relationships shown in FIG. 15 may be displayed on a monitor, and the operator may see the displayed relationships and may estimate the direction of the virtual light source, which is associated with the plotted relationship that forms a straight line, as the direction of one of the light sources, under which the image recording operation was performed.

The camera, which is utilized for acquiring the two-dimensional image signal S0, exhibits a non-linear relationship between the input light and the image signal obtained as the output. Therefore, it is preferable that a gray chart is recorded previously with the camera which is used, the relationship between the input and the output is calculated with respect to the camera, and the input-output characteristics of the camera are compensated for such that the relationship between the input and the output with respect to the camera becomes linear.

In cases where combinations, each of which is constituted of three virtual light sources, are selected from a plurality of the virtual light sources, the directions of the light source, under which the image recording operation was performed, may be estimated in the manner described below.

Figure 17:
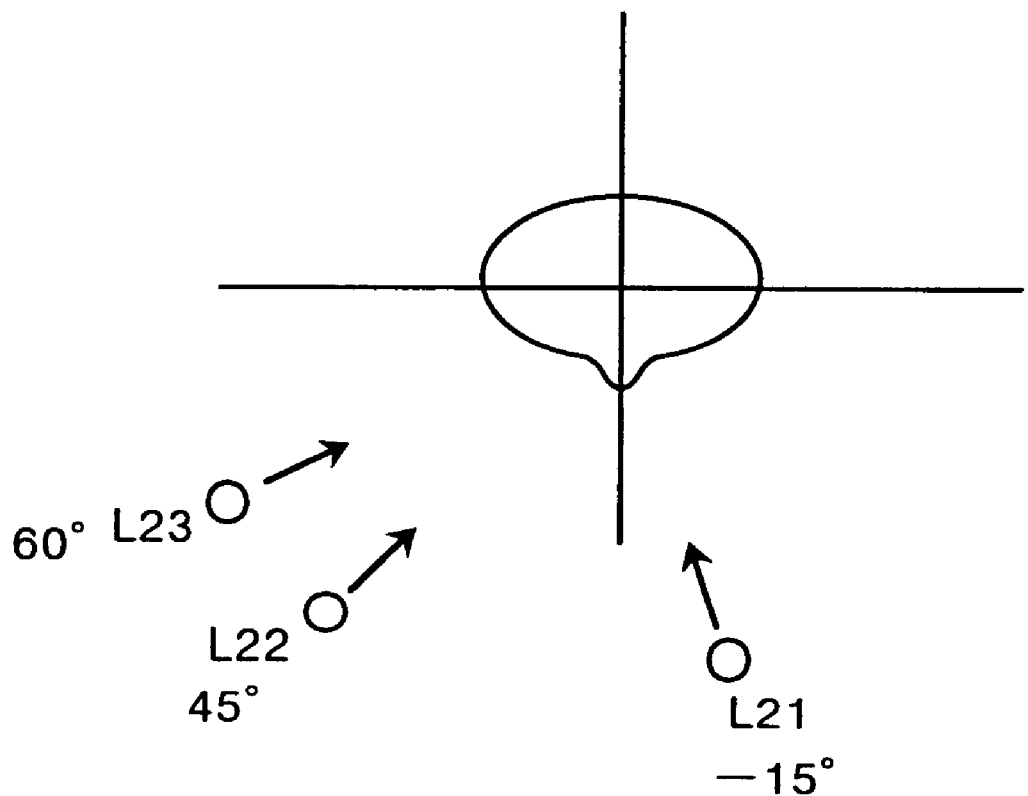
FIG. 17 is an explanatory view showing how estimation of directions of three light sources is performed.
Figure 18A:
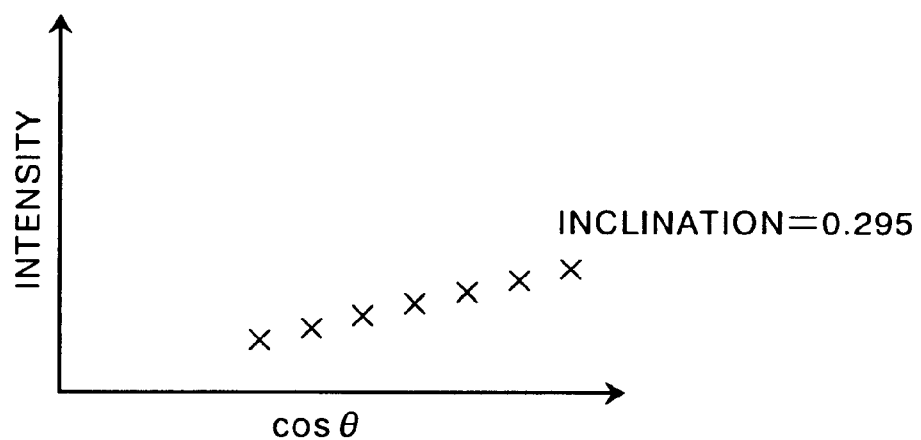
FIGS. 18A and 18B are graphs showing inclinations of straight lines, which are formed by plotted relationships between cosines and intensity values of reflected light.

FIG. 17 is an explanatory view showing how the directions of light sources, under which the image recording operation was performed, are estimated in cases where combinations, each of which is constituted of three virtual light sources, are selected. In this example, it is assumed that three light sources are utilized in the image recording operation and, as illustrated in FIG. 17, light sources L21, L22, and L23 are located respectively in the directions of −15 degrees, +45 degrees, and +60 degrees. Firstly, combinations of the virtual light sources are selected in the same manner as that in the second embodiment described above. In this example, since three light sources are utilized, the number of combinations is equal to $_{13}C_3$=286. With respect to each of the combinations of the virtual light sources, the calculation of the cosines, the selection of the single-irradiation measuring points, the plotting in accordance with the single virtual light sources, and the judgment as to whether the plotted relationship forms or does not form a straight line are performed. In this manner, the direction of one of the light sources, under which the image recording operation was performed, is estimated, and the intensity of the light radiated out from the one estimated light source is calculated. In this example, it is assumed that the light source L21 located in the direction of −15 degrees is firstly estimated, and the intensity of the light radiated out from the light source L21 is calculated to be 0.295 from the inclination of the straight line formed by the plotted relationship shown in FIG. 18A.

Figure 19A:
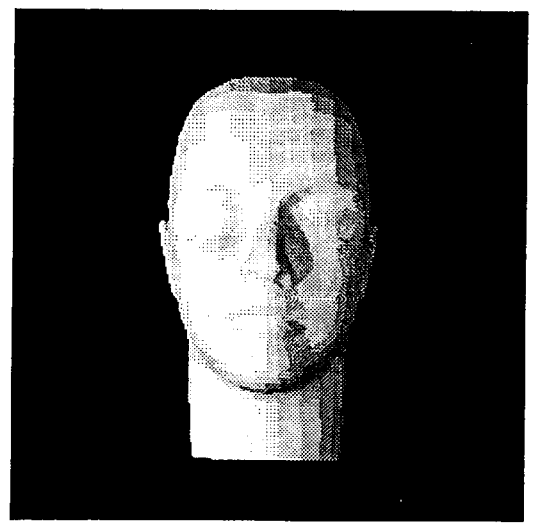
FIGS. 19A, 19B, and 19C are explanatory views showing how signal values change in cases where directions of three light sources are estimated.
Figure 19B:
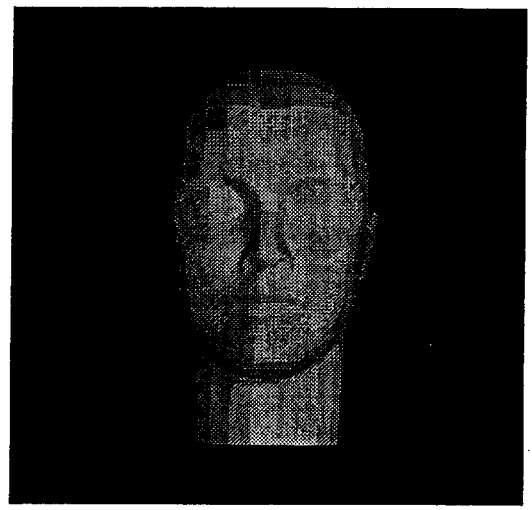

After the direction of the light source L21 and the intensity of the light radiated out from the light source L21 are estimated in the manner described above, the intensity values of the reflected light of the light radiated out from the light source L21 are calculated for respective pixel positions in the face image represented by the two-dimensional image signal S0. Also, the intensity values having thus been calculated for the respective pixels are subtracted from the signal values of the two-dimensional image signal S0, which signal values represent the corresponding pixels. A corrected two-dimensional image signal S0', which represents an image formed with only the light radiated out from the light sources L22 and L23 other than the light source L21, is thereby obtained. FIG. 19A is an explanatory view showing the face image represented by the two-dimensional image signal S0. FIG. 19B is an explanatory view showing the face image formed with only the light radiated out from the light source L21. The image signal, which represents the face image shown in FIG. 19B, is subtracted from the two-dimensional image signal S0, which represents the face image shown in FIG. 19A. From the subtraction, as illustrated in FIG. 19C, the corrected two-dimensional image signal S0', which represents the face image formed with only the light radiated out from the light sources L22 and L23 other than the light source L21, is obtained.

Figure 18B:
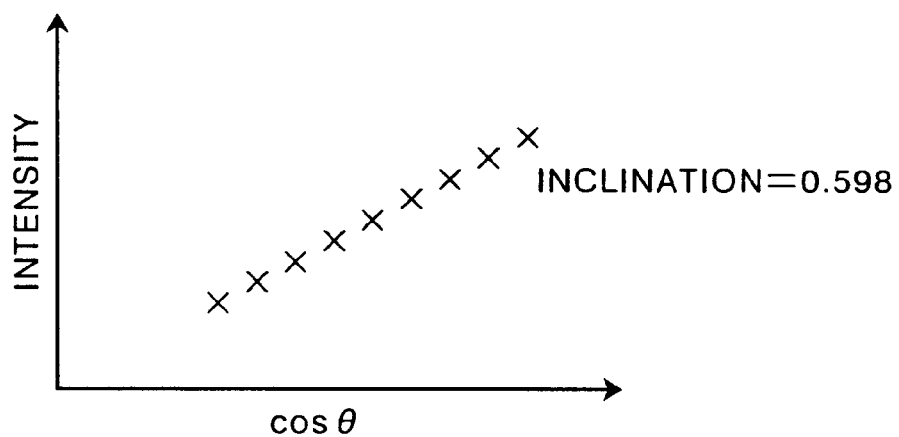

Thereafter, the corrected two-dimensional image signal S0' is taken as a new two-dimensional image signal S0. In accordance with the corrected two-dimensional image signal S0' taken as the new two-dimensional image signal S0, the selection of the combinations of the virtual light sources, the calculation of the cosines with respect to each of the combinations, the selection of the single-irradiation measuring points, the plotting in accordance with the single virtual light source, and the judgment as to whether the plotted relationship forms or does not form a straight line, are performed. In this manner, the direction of one of the two remaining light sources is estimated, and the intensity of light radiated out from the one estimated light source is calculated. In this example, it is assumed that the light source L22 located in the direction of +45 degrees is secondly estimated, and the intensity of the light radiated out from the light source L22 is calculated to be 0.598 from the inclination of the straight line formed by the plotted relationship shown in FIG. 18B.

Figure 19C:
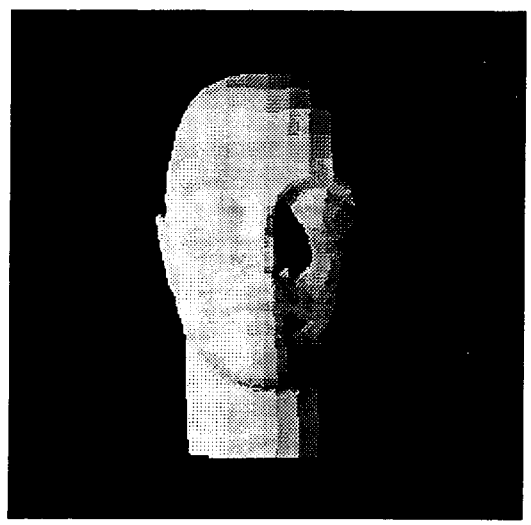
Figure 20A:
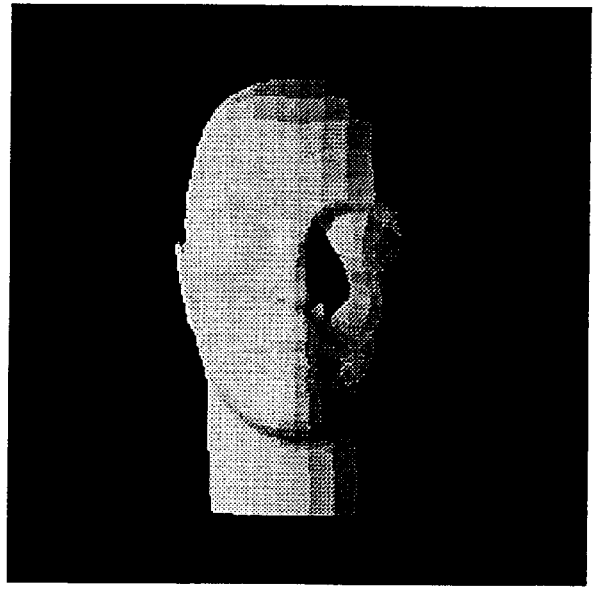
FIGS. 20A and 20B are explanatory views showing how signal values change in cases where directions of three light sources are estimated.

After the direction of the light source L22 and the intensity of the light radiated out from the light source L22 are estimated in the manner described above, the intensity values of the reflected light of the light radiated out from the light source L22 are subtracted from the signal values of the new two-dimensional image signal S0 (i.e., the corrected two-dimensional image signal S0' representing the image shown in FIG. 19C). A new corrected two-dimensional image signal S0', which represents an image formed with only the light radiated out from the light source L23 other than the light source L22, is thereby obtained. FIG. 20A is an explanatory view showing the face image formed with only the light radiated out from the light source L22. The image signal, which represents the face image shown in FIG. 20A, is subtracted from the new two-dimensional image signal S0, which represents the face image shown in FIG. 19C. From the subtraction, as illustrated in FIG. 20B, the new corrected two-dimensional image signal S0', which represents the face image formed with only the light radiated out from the light source other than the light sources L21 and L22, i.e. only the light radiated out from the light source L23, is obtained.

Figure 20B:
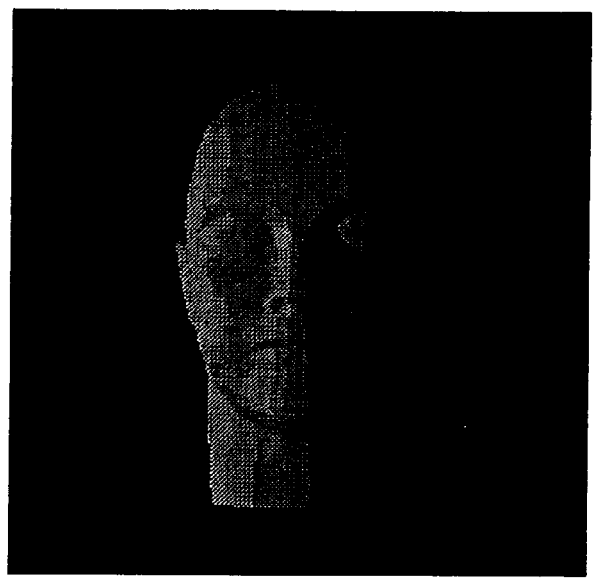

Thereafter, the new corrected two-dimensional image signal S0', which has been obtained from the second estimation of the direction of the light source and which represents the face image shown in FIG. 20B, is taken as a new two-dimensional image signal S0. In accordance with the new corrected two-dimensional image signal S0' taken as the new two-dimensional image signal S0, the calculation of the cosines, the selection of the single-irradiation measuring points, the plotting in accordance with the single virtual light source, and the judgment as to whether the plotted relationship forms or does not form a straight line, are performed. At this time, since the number of the light sources, under which the image recording operation was performed, is three, in the third estimation of the direction of the light source, the new two-dimensional image signal S0 is the one representing the face image formed with only the light radiated out from the light source. Therefore, in the third estimation of the direction of the light source, the selection of the single-irradiation measuring points is not performed, only the plotting of the cosines is performed, and the direction of the virtual light source, which is associated with the plotted relationship that forms a straight line, i.e. the direction of +60 degrees, is estimated as the direction of light source, under which the image recording operation was performed.

As described above, in cases where the number of the virtual light sources constituting each combination becomes large, the estimation of the direction of one light source, the subtraction of the intensity values of the reflected light of the light, which is radiated out from the one light source, from the signal values of the two-dimensional image signal S0 are iterated. In this manner, the directions of all of the light sources, under which the image recording operation was performed, may be estimated.

Figure 21:
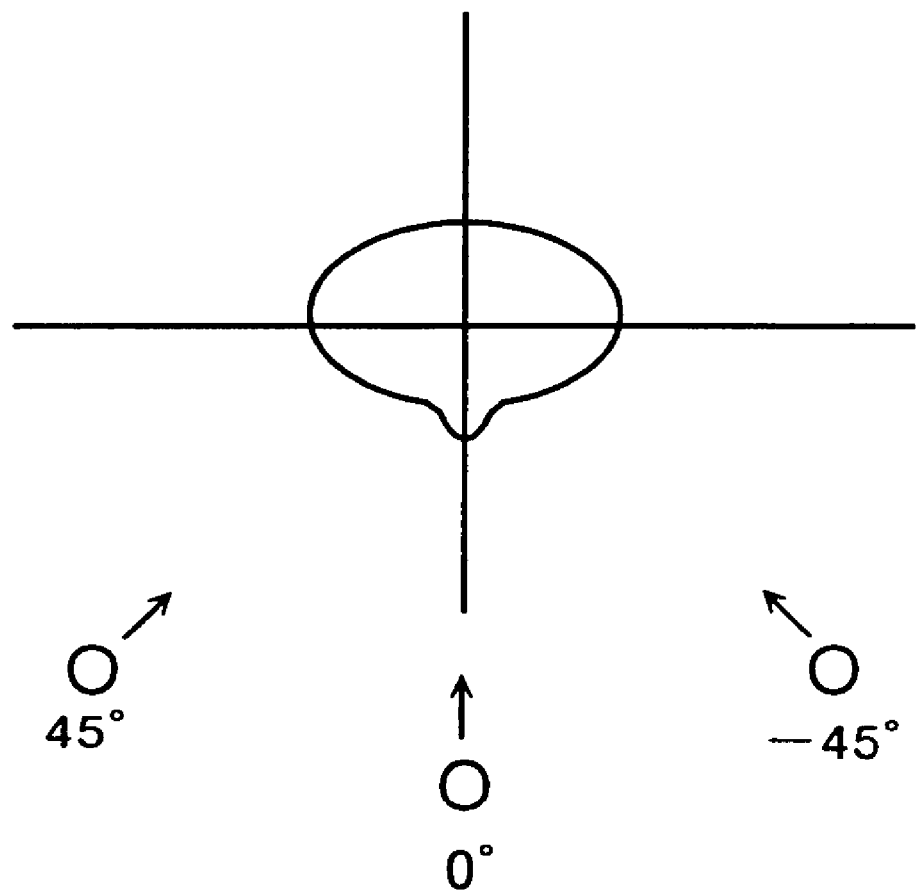
FIG. 21 is an explanatory view showing the cases where directions of light sources cannot be estimated.

In cases where the light sources are located in the directions shown in FIG. 21, the measuring points, at which the light interception occurs or the cosine takes a negative value, do not occur in the image obtained from the image recording operation. Therefore, in such cases, the second embodiment of the light source direction estimating apparatus in accordance with the present invention cannot be applied. However, actually, in the operation for recording the image of the object, the directions of the light sources are not strictly set at the angles shown in FIG. 21, and are set in directions slightly deviated from the angles shown in FIG. 21. Since the points, at which the light interception occurs or the cosine takes a negative value, occur in the image obtained from the image recording operation, the directions of the light sources can be estimated with the second embodiment of the light source direction estimating apparatus in accordance with the present invention.

In the second embodiment described above, it is assumed that the number of the light sources, under which the image recording operation was performed, is unknown. In cases where the number of the light sources, under which the image recording operation was performed, is known, combinations of the virtual light sources in accordance with the number of the light sources, under which the image recording operation was performed, may be selected from the virtual light sources having been set in the plurality of the arbitrary directions. Therefore, in such cases, it is not necessary for the estimation of the directions of the light sources to be performed for the combinations with respect to the entire number of the light sources. Accordingly, the estimation of the directions of the light sources can be performed quickly.

In addition, all of the contents of Japanese Patent Application Nos. 11(1999)-196862, 11(1999)-196863, 2000-157229 and 2000-157230 are incorporated into this specification by reference.

What is claimed is:

1. A light source direction estimating method, wherein an image is obtained, which image has been formed by performing an image recording operation on an object under a substantially single light source, the object containing an area, which has approximately uniform surface reflectivity and which exhibits diffuse reflection, and wherein a direction of the light source, under which the image recording operation was performed, is estimated in accordance with the image, the method comprising the step of:

estimating the direction of the light source, under which the image recording operation was performed, in accordance with signal values of an object image signal, which represents an object image embedded in the image having been obtained from the image recording operation, and relationship between a position of a three-dimensional body image, which is represented by a position-matched three-dimensional shape signal that has been obtained from position matching performed on the object image signal and a three-dimensional shape signal representing a three-dimensional shape of the object, and positions of virtual light sources having been set in a plurality of arbitrary directions.

2. A method as defined in claim 1 wherein a plurality of measuring points are set at an area of the three-dimensional body image, which is represented by the position-matched three-dimensional shape signal that has been obtained from the position matching, the area of the three-dimensional body image corresponding to the area of the object, which area has approximately uniform surface reflectivity and which exhibits diffuse reflection, a calculation is made to find a cosine between a direction vector directed from each of virtual light sources, which have been set in a plurality of arbitrary directions, to each of the measuring points and a normal vector at each of the measuring points, a relationship between the calculated cosines and signal values of the object image signal, which signal values correspond to the plurality of the measuring points, is plotted with respect to each of the directions of the virtual light sources, and a direction of a virtual light source, which direction is associated with a plotted relationship that forms an approximately straight line, is estimated as the direction of the light source, under which the image recording operation was performed.

3. A method as defined in claim 2 wherein a judgment as to whether the plotted relationship forms or does not form an approximately straight line is made in accordance with an evaluating function utilizing a method of least squares, and the estimation of the direction of the light source, under which the image recording operation was performed, is performed in accordance with the results of the judgment.

4. A method as defined in claim 2 wherein intensity of light radiated out from the light source, under which the image recording operation was performed, is estimated in accordance with an inclination of a straight line that is set by the plotted relationship utilized for the estimation of the direction of the light source, under which the image recording operation was performed.

5. A method as defined in claim 1, wherein the object is a face of a person.

6. A method as defined in claim 1, wherein the three-dimensional shape signal is a polygon signal representing the three-dimensional shape of the object.

7. A light source direction estimating apparatus, wherein an image is obtained, which image has been formed by performing an image recording operation on an object under a substantially single light source, the object containing an area, which has approximately uniform surface reflectivity and which exhibits diffuse reflection, and wherein a direction of the light source, under which the image recording operation was performed, is estimated in accordance with the image, the apparatus comprising:

means for estimating the direction of the light source, under which the image recording operation was performed, in accordance with signal values of an object image signal, which represents an object image embedded in the image having been obtained from the image recording operation, and relationship between a position of a three-dimensional body image, which is represented by a position-matched three-dimensional shape signal that has been obtained from position matching performed on the object image signal and a three-dimensional shape signal representing a three-dimensional shape of the object, and positions of virtual light sources having been set in a plurality of arbitrary directions.

8. An apparatus as defined in claim 7 wherein the means for estimating the direction of the light source, under which the image recording operation was performed, comprises:

position matching means for performing position matching on the object image signal, which represents the object image embedded in the image having been obtained from the image recording operation, and the three-dimensional shape signal representing the three-dimensional shape of the object, measuring point setting means for setting a plurality of measuring points at an area of the three-dimensional body image, which is represented by the position-matched three-dimensional shape signal that has been obtained from the position matching, the area of the three-dimensional body image corresponding to the area of the object, which area has approximately uniform surface reflectivity and which exhibits diffuse reflection, cosine calculating means for calculating a cosine between a direction vector directed from each of virtual light sources, which have been set in a plurality of arbitrary directions, to each of the measuring points and a normal vector at each of the measuring points, plotting means for plotting a relationship between the calculated cosines and signal values of the object image signal, which signal values correspond to the plurality of the measuring points, with respect to each of the directions of the virtual light sources, and direction estimating means for estimating a direction of a virtual light source, which direction is associated with a plotted relationship that forms an approximately straight line, as the direction of the light source, under which the image recording operation was performed.

9. An apparatus as defined in claim 8 wherein the direction estimating means comprises judgment means for making a judgment as to whether the plotted relationship forms or does not form an approximately straight line, the judgment being made in accordance with an evaluating function utilizing a method of least squares, and performing the estimation of the direction of the light source, under which the image recording operation was performed, in accordance with the results of the judgment.

10. An apparatus as defined in claim 8 further comprising intensity estimating means for estimating intensity of light radiated out from the light source, under which the image recording operation was performed, in accordance with an inclination of a straight line that is set by the plotted relationship utilized for the estimation of the direction of the light source, under which the image recording operation was performed.

11. An apparatus as defined in claim 7, wherein the object is a face of a person.

12. An apparatus as defined in claim 7, wherein the three-dimensional shape signal is a polygon signal representing the three-dimensional shape of the object.

13. A recording medium, on which a program for causing a computer to execute a light source direction estimating method has been recorded and from which the computer is capable of reading the program, the light source direction estimating method comprising obtaining an image, which has been formed by performing an image recording operation on an object under a substantially single light source, the object containing an area, which has approximately uniform surface reflectivity and which exhibits diffuse reflection, and estimating a direction of the light source, under which the image recording operation was performed, in accordance with the image, wherein the program comprises the procedure for:
estimating the direction of the light source, under which the image recording operation was performed, in accordance with signal values of an object image signal, which represents an object image embedded in the image having been obtained from the image recording operation, and relationship between a position of a three-dimensional body image, which is represented by a position-matched three-dimensional shape signal that has been obtained from position matching performed on the object image signal and a three-dimensional shape signal representing a three-dimensional shape of the object, and positions of virtual light sources having been set in a plurality of arbitrary directions.

14. A recording medium as defined in claim 13 wherein the procedure for estimating the direction of the light source, under which the image recording operation was performed, comprises the procedures for:

performing position matching on the object image signal, which represents the object image embedded in the image having been obtained from the image recording operation, and the three-dimensional shape signal representing the three-dimensional shape of the object, setting a plurality of measuring points at an area of the three-dimensional body image, which is represented by the position-matched three-dimensional shape signal that has been obtained from the position matching, the area of the three-dimensional body image corresponding to the area of the object, which area has approximately uniform surface reflectivity and which exhibits diffuse reflection, calculating a cosine between a direction vector directed from each of virtual light sources, which have been set in a plurality of arbitrary directions, to each of the measuring points and a normal vector at each of the measuring points, plotting a relationship between the calculated cosines and signal values of the object image signal, which signal values correspond to the plurality of the measuring points, with respect to each of the directions of the virtual light sources, and estimating a direction of a virtual light source, which direction is associated with a plotted relationship that forms an approximately straight line, as the direction of the light source, under which the image recording operation was performed.

15. A recording medium as defined in claim 14 wherein the procedure for estimating the direction of the virtual light source, which direction is associated with a plotted relationship that forms an approximately straight line, as the direction of the light source, under which the image recording operation was performed, comprises a procedure for making a judgment as to whether the plotted relationship forms or does not form an approximately straight line, the judgment being made in accordance with an evaluating function utilizing a method of least squares, and performing the estimation of the direction of the light source, under which the image recording operation was performed, in accordance with the results of the judgment.

16. A recording medium as defined in claim 14 wherein the procedure for estimating the direction of the light source, under which the image recording operation was performed, further comprises a procedure for estimating intensity of light radiated out from the light source, under which the image recording operation was performed, in accordance with an inclination of a straight line that is set by the plotted relationship utilized for the estimation of the direction of the light source, under which the image recording operation was performed.

17. A recording medium as defined in claim 13, wherein the object is a face of a person.

18. A recording medium as defined in claim 13, wherein the three-dimensional shape signal is a polygon signal representing the three-dimensional shape of the object.

19. A light source direction estimating method, wherein an image is obtained, which image has been formed by performing an image recording operation on an object under a plurality of light sources such that light interception occurs, the object containing an area, which has approximately uniform surface reflectivity and which exhibits diffuse reflection, and wherein a direction of each of the light sources, under which the image recording operation was performed, is estimated in accordance with the image, the method comprising the step of:

estimating the direction of each of the light sources, under which the image recording operation was performed, in accordance with signal values of an object image signal, which represents an object image embedded in the image having been obtained from the image recording operation, and relationship between a position of a three-dimensional body image, which is represented by a position-matched three-dimensional shape signal that has been obtained from position matching performed on the object image signal and a three-dimensional shape signal representing a three-dimensional shape of the object, and positions of virtual light sources having been set in a plurality of arbitrary directions.

20. A method as defined in claim 19 wherein the direction of each of the light sources, under which the image recording operation was performed, is estimated by:

selecting combinations of virtual light sources from the virtual light sources having been set in the plurality of the arbitrary directions, setting a plurality of measuring points at an area of the three-dimensional body image, which is represented by the position-matched three-dimensional shape signal that has been obtained from the position matching, the area of the three-dimensional body image corresponding to the area of the object, which area has approximately uniform surface reflectivity and which exhibits diffuse reflection, selecting single-irradiation measuring points, which are exposed to only light radiated out from a single virtual light source when light is irradiated from each of the combinations of the virtual light sources to the three-dimensional body image, from the plurality of the measuring points and in accordance with the object image signal, calculating a cosine between a direction vector, which is directed from the single virtual light source to each of the single-irradiation measuring points, and a normal vector at each of the single-irradiation measuring point, plotting a relationship between the calculated cosines and signal values of the object image signal, which signal values correspond to the single-irradiation measuring points, with respect to each of the directions of the virtual light sources, estimating a direction of a virtual light source, which direction is associated with a plotted relationship that forms an approximately straight line, as a direction of one light source among the light sources, under which the image recording operation was performed, estimating a relative intensity value of light radiated out from the one light source in accordance with an inclination of a straight line, which is set by the plotted relationship utilized for the estimation of the direction of the one light source, removing effects of light, which is radiated out from the one light source, from the object image signal, which has been subjected to the position matching, in accordance with the relative intensity value of light radiated out from the one light source, to acquire a corrected object image signal, and iterating the selection of combinations of virtual light sources from the virtual light sources other than the virtual light source located in the direction of the one light source, the selection of single-irradiation measuring points in accordance with the corrected object image signal being employed as a new object image signal, the calculation of cosines, the plotting, the estimation of a direction of one light source, the estimation of a relative intensity value of light radiated out from the one light source, and the acquisition of a corrected object image signal, till directions of all of the light sources, under which the image recording operation was performed, are estimated.

21. A method as defined in claim 20 wherein, in cases where the number of the light sources, under which the image recording operation was performed, is known, combinations of the virtual light sources in accordance with the number of the light sources, under which the image recording operation was performed, are selected from the virtual light sources having been set in the plurality of the arbitrary directions.

22. A method as defined in claim 20 wherein a judgment as to whether the plotted relationship forms or does not form an approximately straight line is made in accordance with an evaluating function utilizing a method of least squares, and the estimation of the direction of the light source is performed in accordance with the results of the judgment.

23. A method as defined in claim 19, wherein the object is a face of a person.

24. A method as defined in claim 19, wherein the three-dimensional shape signal is a polygon signal representing the three-dimensional shape of the object.

25. A light source direction estimating apparatus, wherein an image is obtained, which image has been formed by performing an image recording operation on an object under a plurality of light sources such that light interception occurs, the object containing an area, which has approximately uniform surface reflectivity and which exhibits diffuse reflection, and wherein a direction of each of the light sources, under which the image recording operation was performed, is estimated in accordance with the image, the apparatus comprising:

means for estimating the direction of each of the light sources, under which the image recording operation was performed, in accordance with signal values of an object image signal, which represents an object image embedded in the image having been obtained from the image recording operation, and relationship between a position of a three-dimensional body image, which is represented by a position-matched three-dimensional shape signal that has been obtained from position matching performed on the object image signal and a three-dimensional shape signal representing a three-dimensional shape of the object, and positions of virtual light sources having been set in a plurality of arbitrary directions.

26. An apparatus as defined in claim 25 wherein the means for estimating the direction of each of the light sources, under which the image recording operation was performed, comprises:

combination selecting means for selecting combinations of virtual light sources from the virtual light sources having been set in the plurality of the arbitrary directions, measuring point setting means for setting a plurality of measuring points at an area of the three-dimensional body image, which is represented by the position-matched three-dimensional shape signal that has been obtained from the position matching, the area of the three-dimensional body image corresponding to the area of the object, which area has approximately uniform surface reflectivity and which exhibits diffuse reflection, single-irradiation measuring point selecting means for selecting single-irradiation measuring points, which are exposed to only light radiated out from a single virtual light source when light is irradiated from each of the combinations of the virtual light sources to the three-dimensional body image, from the plurality of the measuring points and in accordance with the object image signal, cosine calculating means for calculating a cosine between a direction vector, which is directed from the single virtual light source to each of the single-irradiation measuring points, and a normal vector at each of the single-irradiation measuring point, plotting means for plotting a relationship between the calculated cosines and signal values of the object image signal, which signal values correspond to the single-irradiation measuring points, with respect to each of the directions of the virtual light sources, direction estimating means for estimating a direction of a virtual light source, which direction is associated with a plotted relationship that forms an approximately straight line, as a direction of one light source among the light sources, under which the image recording operation was performed, intensity value estimating means for estimating a relative intensity value of light radiated out from the one light source in accordance with an inclination of a straight line, which is set by the plotted relationship utilized for the estimation of the direction of the one light source, correction means for removing effects of light, which is radiated out from the one light source, from the object image signal, which has been subjected to the position matching, in accordance with the relative intensity value of light radiated out from the one light source, to acquire a corrected object image signal, and control means for controlling the combination selecting means, the measuring point setting means, the single-irradiation measuring point selecting means, the cosine calculating means, the plotting means, the direction estimating means, the intensity value estimating means, and the correction means, such that the selection of combinations of virtual light sources from the virtual light sources other than the virtual light source located in the direction of the one light source, the selection of single-irradiation measuring points in accordance with the corrected object image signal being employed as a new object image signal, the calculation of cosines, the plotting, the estimation of a direction of one light source, the estimation of a relative intensity value of light radiated out from the one light source, and the acquisition of a corrected object image signal, are iterated till directions of all of the light sources, under which the image recording operation was performed, are estimated.

27. An apparatus as defined in claim 26 wherein, in cases where the number of the light sources, under which the image recording operation was performed, is known, the combination selecting means selects combinations of the virtual light sources in accordance with the number of the light sources, under which the image recording operation was performed, from the virtual light sources having been set in the plurality of the arbitrary directions.

28. An apparatus as defined in claim 26 wherein the direction estimating means comprises judgment means for making a judgment as to whether the plotted relationship forms or does not form an approximately straight line, the judgment being made in accordance with an evaluating function utilizing a method of least squares, and performing the estimation of the direction of the light source in accordance with the results of the judgment.

29. An apparatus as defined in claim 25, wherein the object is a face of a person.

30. An apparatus as defined in claim 25, wherein the three-dimensional shape signal is a polygon signal representing the three-dimensional shape of the object.

31. A recording medium, on which a program for causing a computer to execute a light source direction estimating method has been recorded and from which the computer is capable of reading the program, the light source direction estimating method comprising obtaining an image, which has been formed by performing an image recording operation on an object under a plurality of light sources such that light interception occurs, the object containing an area, which has approximately uniform surface reflectivity and which exhibits diffuse reflection, and estimating a direction of each of the light sources, under which the image recording operation was performed, in accordance with the image, wherein the program comprises the procedure for:
estimating the direction of each of the light sources, under which the image recording operation was performed, in accordance with signal values of an object image signal, which represents an object image embedded in the image having been obtained from the image recording operation, and relationship between a position of a three-dimensional body image, which is represented by a position-matched three-dimensional shape signal that has been obtained from position matching performed on the object image signal and a three-dimensional shape signal representing a three-dimensional shape of the object, and positions of virtual light sources having been set in a plurality of arbitrary directions.

32. A recording medium as defined in claim 31 wherein the procedure for estimating the direction of each of the light sources, under which the image recording operation was performed, comprises the procedures for:
selecting combinations of virtual light sources from the virtual light sources having been set in the plurality of the arbitrary directions,
setting a plurality of measuring points at an area of the three-dimensional body image, which is represented by the position-matched three-dimensional shape signal that has been obtained from the position matching, the area of the three-dimensional body image corresponding to the area of the object, which area has approximately uniform surface reflectivity and which exhibits diffuse reflection,
selecting single-irradiation measuring points, which are exposed to only light radiated out from a single virtual light source when light is irradiated from each of the combinations of the virtual light sources to the three-dimensional body image, from the plurality of the measuring points and in accordance with the object image signal,
calculating a cosine between a direction vector, which is directed from the single virtual light source to each of the single-irradiation measuring points, and a normal vector at each of the single-irradiation measuring point,
plotting a relationship between the calculated cosines and signal values of the object image signal, which signal values correspond to the single-irradiation measuring points, with respect to each of the directions of the virtual light sources,
estimating a direction of a virtual light source, which direction is associated with a plotted relationship that forms an approximately straight line, as a direction of one light source among the light sources, under which the image recording operation was performed,
estimating a relative intensity value of light radiated out from the one light source in accordance with an inclination of a straight line, which is set by the plotted relationship utilized for the estimation of the direction of the one light source,
removing effects of light, which is radiated out from the one light source, from the object image signal, which has been subjected to the position matching, in accordance with the relative intensity value of light radiated out from the one light source, to acquire a corrected object image signal, and
iterating the selection of combinations of virtual light sources from the virtual light sources other than the virtual light source located in the direction of the one light source, the selection of single-irradiation measuring points in accordance with the corrected object image signal being employed as a new object image signal, the calculation of cosines, the plotting, the estimation of a direction of one light source, the estimation of a relative intensity value of light radiated out from the one light source, and the acquisition of a corrected object image signal, till directions of all of the light sources, under which the image recording operation was performed, are estimated.

33. A recording medium as defined in claim 32 wherein, in cases where the number of the light sources, under which the image recording operation was performed, is known, combinations of the virtual light sources in accordance with the number of the light sources, under which the image recording operation was performed, are selected from the virtual light sources having been set in the plurality of the arbitrary directions.

34. A recording medium as defined in claim 32 wherein the procedure for estimating the direction of the virtual light source, which direction is associated with a plotted relationship that forms an approximately straight line, as the direction of one light source among the light sources, under which the image recording operation was performed, comprises a procedure for making a judgment as to whether the plotted relationship forms or does not form an approximately straight line, the judgment being made in accordance with an evaluating function utilizing a method of least squares, and performing the estimation of the direction of the one light source in accordance with the results of the judgment.

35. A recording medium as defined in claim 31, wherein the object is a face of a person.

36. A recording medium as defined in claim 31, wherein the three-dimensional shape signal is a polygon signal representing the three-dimensional shape of the object.

* * * * *